United States Patent [19]
Karrai et al.

[11] Patent Number: 6,006,594
[45] Date of Patent: Dec. 28, 1999

[54] SCANNING PROBE MICROSCOPE HEAD WITH SIGNAL PROCESSING CIRCUIT

[75] Inventors: Khaled Karrai; Stephan Manus, both of Munich, Germany

[73] Assignee: Dr. Khaled und Dr. Miles Haines Gesellschaft Burgerlichen Rechts

[21] Appl. No.: 08/827,216

[22] Filed: Mar. 28, 1997

Related U.S. Application Data

[63] Continuation-in-part of application No. 08/395,089, Feb. 27, 1995, Pat. No. 5,641,896.

[30] Foreign Application Priority Data

May 11, 1994 [GB] United Kingdom .................. 9409414

[51] Int. Cl.$^6$ ...................................................... G01B 7/34
[52] U.S. Cl. ............................................. 73/105; 250/306
[58] Field of Search .............................. 73/155; 250/346, 250/347

[56] References Cited

U.S. PATENT DOCUMENTS

| | | | |
|---|---|---|---|
| 4,343,993 | 8/1982 | Binnig et al. | 250/306 |
| 4,851,671 | 7/1989 | Pohl | 250/306 |
| 5,105,305 | 4/1992 | Betzig et al. | 359/368 |
| 5,159,486 | 10/1992 | Webb | 359/241 X |
| 5,212,987 | 5/1993 | Dransfeld et al. | 73/579 |
| 5,280,341 | 1/1994 | Nonnenmacher et al. | 356/358 |
| 5,467,642 | 11/1995 | Hosaka et al. | 73/105 |
| 5,641,896 | 6/1997 | Karrai | 73/101 |
| 5,663,507 | 9/1997 | Westervelt et al. | 73/727 |
| 5,780,727 | 7/1998 | Gimzewski et al. | 73/105 |

FOREIGN PATENT DOCUMENTS

| | | |
|---|---|---|
| 112401 | 7/1984 | European Pat. Off. . |
| 394962 | 10/1990 | European Pat. Off. . |
| 422548 | 4/1991 | European Pat. Off. . |
| 487233 | 5/1992 | European Pat. Off. . |
| 545538 | 6/1993 | European Pat. Off. . |
| 587459 | 3/1994 | European Pat. Off. . |
| 2 289 759 | 11/1995 | United Kingdom . |
| 8701 | 3/1996 | WIPO . |

OTHER PUBLICATIONS

*Patent Abstracts of Japan* ABS Grp P1587 vol. 17, No. 425 Abs pub date (Aug. 6, 1993) (05–87826) "Acceleration Sensor" Yasunori Otsuki et al.

Patent Abstracts of Japan, JP–A–3–167744, E–1123, vol. 15, No. 408 (Oct. 17, 1991). "Small Distance Moving Mechanism".

Akamine, S., et al., "Microfabricated Scanning Tunneling Microscope," *IEEE Electron Device Letters*, vol. 10, No. 11, pp. 490–492 (Nov. 1989).

Betzig, E., et al., "Combined Shear Force and Near–Field Scanning Optical Microscopy," *Applied Physics Letters*, vol. 60, No. 20, pp. 2484–2486 (May 18, 1992).

Buckland, E.L., et al., "Resolution in Collection–Mode Scanning Optical Microscopy," *Journal of Applied Physics*, vol. 73, No. 3, pp. 1018–1028 (Feb. 1, 1993).

(List continued on next page.)

Primary Examiner—Thomas P. Noland
Attorney, Agent, or Firm—Watts Hoffman Fisher & Heinke

[57] ABSTRACT

A head for a scanning probe microscope comprising a tuning fork (130) with an SPM tip (134) attached to one prong of the tuning fork. An AC signal (Vin) generated by oscillation of the tuning fork is supplied by a pair of electrodes on the tuning fork to input terminals (110 and 112) of a source-follower circuit comprising a dual-gate GaAs-MESFET (114), the gates (G1, G2) of which are connected in parallel to one of the pick-up electrodes via one of the input terminals (110), the other of the pick-up electrodes being earthed via the other of the input terminals (112). The signal (Vin) is processed by the circuit and supplied to two output terminals (126 and 128) as an output signal (Vout). The megaohm output impedance of the tuning fork is thus translated into an output impedance of the order of a hundred ohms, thus improving signal transfer efficiency from the head to an external signal amplifier.

20 Claims, 29 Drawing Sheets

(2 of 29 Drawing Sheet(s) Filed in Color)

OTHER PUBLICATIONS

Clayton, L., et al., "Miniature Crystalline Quartz Electromechanical Structures," *Sensors and Actuators*, vol. 20, pp. 171–177 (1989). Month not given.

Grober, R., et al., "Design and Implementation of a Low Temperature Near–Field Scanning Optical Microscope," *Review of Scientific Instruments*, vol. 65, No. 3, pp. 626–631 (Mar. 1994).

Itoh, T., et al., "Piezoelectric Sensor for Detecting Force Gradients in Atomic Force Microscopy," *Japanese Journal of Applied Physics*, vol. 33, Pt. 1, No. 1A, pp. 334–340 (Jan. 1994).

Pohl, D.W., et al., "Optical Stethoscopy: Image Recording with Resolution $\lambda/20$," *Applied Physics Letters*, vol. 44, No. 7, pp. 651–653 (Apr. 1, 1984).

Sasaki, A., et al., "Scanning Shearing–Stress Microscopy of Gold Thin Films," *Japanese Journal of Applied Physics*, vol. 33, Pt. 2, No. 4A, pp. L 547 –L 549 (Apr. 1994).

Takata, K., "Whole Electronic Cantilever Control for Atomic Force Microscopy," *Review of Scientific Instruments*, vol. 64, No. 9, pp. 2598–2600 (Sep. 1993).

Tansock, J., et al., "Force Measurement with a Piezoelectric Cantilever in a Scanning Force Microscope," *Ultramicroscopy*, vol. 42–44, pp. 1464–1469 (1992). month not given.

Toledo–Crow, R., et al., "Near–Field Differential Scanning Optical Microscope with Atomic Force Regulation," *Applied Physics Letters*, vol. 60, No. 24, pp. 2957–2959 (Jun. 15, 1992).

Tortonese, M., et al., "Atomic Resolution with an Atomic Force Microscope Using Piezoresistive Detection," *Applied Physics Letters*, vol. 62, No. 8, pp. 834–836 (Feb. 22, 1993).

Betzig, E., et al., "Breaking the Diffraction Barrier: Optical Microscopy on a Nanometric Scale," *Science*, vol. 251, pp. 1468–1470 (Mar. 22, 1991).

Karrai, K., et al., "Piezoelectric Tip–sample Distance Control for Near Field Optical Microscopes," *Applied Physics Letters*, vol. 66, No. 14, pp. 1842–1844 (Apr. 3, 1995).

Figure 6A
Figure 6B
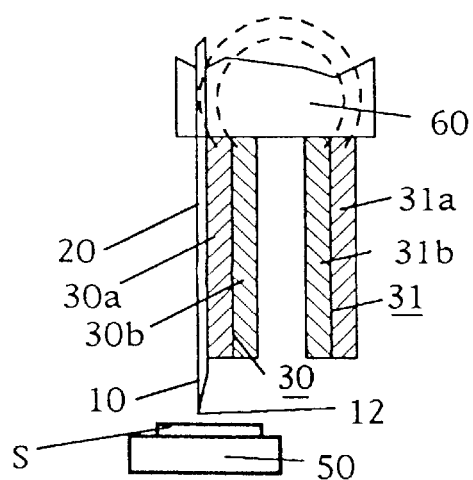
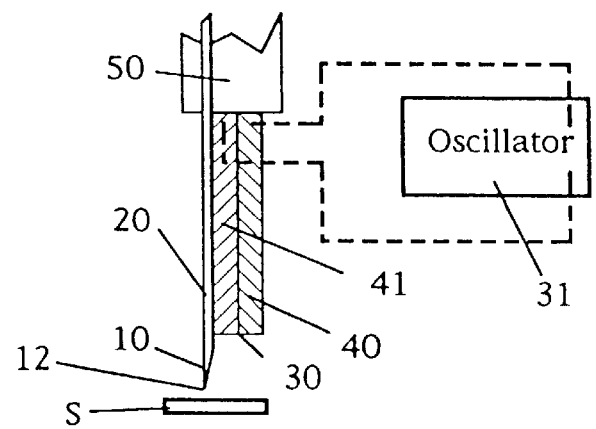

Fig. 15

|     | 4A     | 4B     | 5A     | 5B       | 5C       |
|-----|--------|--------|--------|----------|----------|
| FET | 3SK166 | 2N4416 | 3SK166 | SGM2016P | SGM2006P |
| RG  | 10MΩ   | 10MΩ   | 2MΩ    | 2MΩ      | 2.2MΩ    |
| RS  | 2.2kΩ  | 1.21kΩ | 2.2kΩ  | 1.5kΩ    | 1.2kΩ    |
| CB  | —      | —      | 10nF   | 10nF     | 10nF     |
| RB  | —      | —      | 15kΩ   | 15kΩ     | 15kΩ     |
| CD  | 47nF   | 47nF   | 47nF   | 47nF     | 47nF     |

SCANNING PROBE MICROSCOPE HEAD WITH SIGNAL PROCESSING CIRCUIT

This patent application is a continuation-in-part of U.S. patent application Ser. No. 08/395,089, filed Feb. 27, 1995, now U.S. Pat. No. 5,641,896.

FIELD OF THE INVENTION

The invention relates to a scanning probe microscope (SPM) and to a head therefor.

The SPM of the invention is especially well suited for use as a near field microscope (NSOM), an atomic force microscope (AFM), a friction force microscope (FFM), or as an SPM capable of being used in two or more of the above modes either simultaneously (parallel) or in sequence (serial). The most preferred combination is parallel NSOM and FFM.

BACKGROUND OF THE INVENTION

The first scanning probe microscope was the Nobel prize winning scanning tunneling microscope (STM) of Binnig and Rohrer described for instance in U.S. Pat. No. 4,343,993. Since this original design, a whole family of scanning probe microscopes has grown up. Notable members are the AFM in which the atomic force between tip and sample is measured as opposed to the tunneling current in the STM; the NSOM, described for instance in EP-A-0112401, in which a waveguide tip, usually the tip of an optical fiber, measures optical coupling between tip and sample; and the IFM in which a force arising from coupling between tip and sample due to the presence of a liquid or gaseous viscous medium such as water or air respectively.

The present invention relates to scanning probe microscopes of the type in which the tip is vibratable relative to the sample. Typically, the tip or sample is set into periodic motion by a driver means, often referred to in the art as a dither and sometimes as a wobbler. The tip-sample coupling is measured by its effect on one or more of the vibrational properties of the tip. Known methods of measuring the tip-sample interaction are through changes in the frequency of vibration of the tip, changes in the amplitude of vibration of the tip, and changes in the phase of vibration of the tip.

In U.S. Pat. No. 4,851,671 the frequency of the vibration of the tip is measured by electrical means. The tip is secured to a piezoelectrical crystal which is driven at one of its natural resonance frequencies, thus setting the tip into oscillatory motion normal to the surface of the sample by excitation of a shear mode of the piezoelectric crystal. Tip-sample interaction changes the frequency of vibration of the tip and results in feedback into the driver circuit. This frequency change of the driver circuit is then measured with standard electronic counting means.

Toledo-Crow et al disclose a scanning probe microscope in Applied Physics Letters, volume 60, pages 2957 to 2959 (1992) which measures changes in the amplitude of the tip vibration. This has the advantage of offering an intrinsically more rapid measurement than measurement of the frequency since alterations in the damping, i.e. the magnitude of the vibration can, in principle, be measured instantaneously. Toledo-Crow et al use optical means to measure the vibrational amplitude. This optical means comprises a laser source, a Wollaston prism, a beam splitter, an objective lens, a polarisation analyzer and a light detector. An apparatus following the design of Toledo-Crow et al is accurate, rapid and quite sensitive.

However, despite these advantages, it is quite complicated to build, it is costly, it takes up a considerable amount of space and also requires alignment of the optical components. Additionally this alignment can be disturbed by mechanical shocks. Due to the alignment required, it is difficult to operate such an apparatus in a completely automated manner as required for instance in a satellite, in a hazardous environment such as a nuclear reactor, in a vacuum chamber, or in a cryostat and as desired in a commercial turnkey system. The spatial requirements of the apparatus can also be a problem in some applications, for instance it would not be easy to design an apparatus of this kind for use in the limited sample space of a magnet cryostat. A further consequence of the size and alignment requirements, is that, in order to build up an image, it is the sample which must be rastered since rastering the tip would necessitate rastering the whole optical set-up which would be impractical. This is not important for some samples, but can be a problem for large or heavy samples, such as mechanical work pieces, or samples which cannot be kept still, such as living organisms or plant matter.

Another apparatus which uses optical means to measure the vibration of the tip is described by Betzig et al in Applied Physics Letters, volume 60, pages 2484 to 2486 (1992). Embodiments are disclosed which not only measure the amplitude and/or phase of the vibration. The apparatus of Betzig et al has similar advantages and disadvantages to that of Toledo-Crow et al.

It has thus been recognized in the art that the optical external deflection sensors which are particularly prevalent in cantilever AFM designs (see for instance EP-A-0 422 548 and EP-A-0 394 962) work very well but, when used, make up a large part of the complexity, size and cost of the instrument. There is therefore a recognised want for simpler, less costly sensing means with at least comparable sensitivity. In particular, the piezoelectric effect has been used, not only in the above-mentioned U.S. Pat. No. 4,851,671 but also by Tortonese et al in Applied Physics Letters, volume 62, pages 834 to 836 (1993) and by Tansock and Williams in Ultramicroscopy, volume 42 to 44, pages 1464 to 1469 (1992).

Tortonese et al use a piezoresistive effect whereby the cantilever arm of an AFM is made of piezoelectric material and bending of the cantilever arm by the tip-sample interaction changes the resistance of the cantilever arm. This approach has proved to work well but the sensor is restricted to DC operation since there is no inverse piezoresistive effect, i.e. one cannot apply a resistance to strain the cantilever arm.

Tansock and Williams describe a cantilever suitable for an AFM in which the cantilever is also made of piezoelectric material but in the form of a bimorph. This cantilever is therefore vibratable and hence suitable for use in a scanning probe microscope of the initially named kind by applying an AC voltage across either half of the bimorph. However, the Q-factor of a simple cantilever, i.e. of a single beam, is typically poor, having for example a value of only Q=7 in the above publication.

Dransfeld et al in U.S. Pat. No. 5,212,987 disclose an acoustic scanning microscope using a piezoelectric tuning fork. The tuning fork is driven so that the oscillation of its prongs generate acoustic waves. The tuning fork needs to be aligned relative to the sample to be measured such that the direction of oscillation of the prongs is inclined either perpendicular to or with a significant component perpendicular to the sample surface. Acoustic waves then pass through the air, or another fluid medium which can support acoustic waves, and reflect from the sample surface and then return to the tuning fork and cause feedback. In this way the oscillations of the tuning fork are sensitive to the topography and acoustic properties of the sample surface and an image can be built up.

The acoustic scanning microscope also has the restriction that the signal is highly dependent on the acoustic medium, there being for example a strong pressure dependency of the characteristic. In vacuum the method cannot work at all as no acoustic waves are supported. In liquid mediums such as liquid helium it is not clear whether such a technique would be practical and what effects, for instance, the superfluid phase transitions would have. Moreover, due to the wavelength of acoustic waves, the technique is limited to a best resolution across the sample surface of approximately 50 nanometers.

It is thus an object of the present invention to provide a scanning probe microscope, wherein changes in the vibration of the tip are measurable by means which do not require optical or mechanical alignment, wherein changes in the vibrational state of the tip can be made rapidly, accurately and to a high degree of sensitivity, wherein the head is compact and light, wherein the head is rugged. It is a further object of the present invention to provide a head for a scanning probe microscope that is operable in hostile and confined environments, such as in cryostats or in a vacuum chamber, the head being positionable remote, e.g. several meters or more, from a signal amplifier without degradation in performance.

SUMMARY OF THE INVENTION

A scanning probe microscope according to a first aspect of the invention comprises: a tip for interacting with a sample; a piezoelectric element connected to the tip and having an electrode for picking up an AC electrical signal generated by oscillation of the piezoelectric element and influenced by external forces acting on the tip; and a signal processing circuit for receiving said AC electrical signal from said pick-up electrode of the piezoelectric element as input, processing said signal and delivering said signal from the head as an output signal for a signal amplifier, said signal processing circuit comprising a field effect transistor having a source, a drain, and a gate, said gate being connected to said pick-up electrode to receive said AC electrical signal.

A scanning probe microscope according to a second aspect of the invention comprises: a tip for interacting with a sample; a piezoelectric element connected to the tip and having an electrode for picking up an AC electrical signal generated by oscillation of the piezoelectric element and influenced by external forces acting on the tip; a signal processing circuit for receiving said AC electrical signal from said pick-up electrode of the piezoelectric element as input, processing said signal and delivering a processed signal to a signal output terminal of said signal processing circuit, said signal processing circuit comprising a field effect transistor having a source, a drain, and a gate, said gate being connected to said pick-up electrode to receive said AC electrical signal; a signal amplifier having a signal input terminal; and a cable arranged to connect said signal output terminal of said signal processing circuit to said signal input terminal of said signal amplifier.

A scanning probe microscope according to a third aspect of the invention comprises: a tip piece for interaction with a sample; a first sample positioner for providing relative movement of the tip piece towards and away from the sample in a first direction; a second sample positioner for providing relative movement of the tip piece across the sample in a plane (x,z) substantially perpendicular to said first direction (y); a dither for setting the tip piece into oscillation relative to the sample; a piezoelectric element connected to the tip piece and influenced by external forces acting on the tip; a pick-up electrode for obtaining an electrical signal responsive to said interaction with said sample from the piezoelectic element; and a signal processing circuit for receiving said electrical signal and comprising a field effect transistor having a source, a drain, and a gate, said gate being connected to said pick-up electrode to receive said electrical signal.

A scanning probe microscope according to a fourth aspect of the invention comprises: a tip piece for interaction with a sample; first displacement means for providing relative movement of the tip piece towards and away from the sample in a first direction (y); second displacement means for providing relative movement of the tip piece across the sample in a plane (x,z) substantially perpendicular to said first direction (y); dither means for setting the tip piece into oscillation relative to the sample substantially in a plane (x, z) perpendicular to said first direction (y); a coupled oscillator arrangement comprising a first oscillator means and a second oscillator means coupled thereto, with said first oscillator means being a first portion of piezoelectric material extending in said first direction (y) having a first end held to a block and a second end remote said block connected with the tip piece, the tip piece extending in said first direction (y) beyond said second end of the first portion of piezoelectric material; pick-up means for obtaining an electrical signal responsive to said interaction with said sample from the coupled oscillator arrangement.

For SPMs of the kind described above which dither or vibrate the tip piece in operation, the tip piece or some other cooperating member or circuit forms an oscillator. The quality factor or Q-factor of this oscillator is an important parameter for the performance of the SPM as discussed above in relation to the prior art. By the provision of a piezoelectric oscillator arrangement in accordance with the invention, the Q-factor can be dramatically increased, and as will be described in more detail below, can be readily manufactured to pre-calculated optimal design values over a wide range.

Some of the advantages of the scanning probe microscope of the invention are now briefly mentioned. The signal is purely electrical and therefore very easy to collect and process. The instrument is very sensitive. The signal responds very quickly to changes in the vibrational frequency, amplitude and phase of the tip piece. The absence of optical components associated with the pick-up means and the fact that no optical access to the tip piece is required results in a very compact design of the head, where head is used here as a collective term for those components of the SPM which need to be in close proximity and/or rigid association with the tip piece.

The design of the SPM of the invention results in the head (i.e. that part of the scanning probe microscope which is physically scanned with the tip piece over the sample, for example in one preferred embodiment tip piece, tuning fork and ceramic piezo dither block) being a small, robust component which can withstand hostile environments such as extremes of temperature. Moreover, the nature of the design means that the head is a physically separate part of the SPM which is only linked to the remainder of the SPM by electrical leads, and, in the case of an NSOM, also optical coupling, typically an optical fiber, which can be flexible and non-lossy. In the best mode of the invention, the head comprises a signal processing circuit comprising a field of effect transistor, the gate of which is connected by a conductive path to a pick-up electrode of the piezoelectric oscillator. The signal processing circuit that is part of the head renders the electrical leads to the signal amplifier non-lossy. Consequently, the head can be employed remote from the remainder of the SPM without loss of signal. For example, the head can be installed in a cryostat, including a magnet cryostat, in a vacuum chamber or in a separate radioactive environment. Conventional feed-outs from the cryostat, vacuum chamber etc. can be used to connect the head with the rest of the SPM.

For use as a scanning optical microscope, the tip piece is the end portion of an optical fiber and terminates in an optically transmissive aperture. For use as a near-field scanning optical microscope in particular it is preferable that the tip piece has a reflective coating around its optically transmissive aperture.

In particular for SPMs which will only be used in AFM or FFM modes, the SPM can be made so that the tip piece is integral with a first portion of piezoelectric material. For instance, such a first portion of piezoelectric material can be micro-machined or etched at one end in order to produce an elongate portion serving as the tip piece.

In an advantageous embodiment a coupled oscillator arrangement is provided in which the first oscillator means is a bimorph, i.e. the first portion of piezoelectric material is subdivided into at least two connected parts with different piezoelectric characters. Typically there will be two connected elongate halves with proportions similar to a conventional bimetallic strip. The two halves will either be made of different materials or of the same material but connected together with different relative crystal orientations.

In the most preferred embodiments of the SPM of the invention a coupled oscillator is provided in which the second oscillator means is also made from a portion of piezoelectric material, namely the second portion of piezoelectric material. The second piece can of course also be a bimorph in a similar manner to that described above in relation to the first portion of piezoelectric material.

In the version of the SPM of the invention which I have used more extensively than any other to date and which appears to give very good results, a coupled oscillator arrangement is provided in which the first and second oscillator means are formed by a tuning fork, the tuning fork having first and second prongs in the conventional manner. This is a particularly attractive design from the practical and commercial point of view since the technology associated with tuning forks, in particular quartz tuning forks used in the watch industry, is very mature. In particular, such tuning forks produce an almost exactly defined frequency, are highly reliable and very cheap.

In another range of embodiments of the SPM of the invention, instead of using piezoelectric material to form both the first and second oscillator means of a coupled oscillator, the second oscillator means is an oscillator circuit, typically be an electronic circuit. The oscillator circuit is then coupled to the first oscillator means either electronically, for example with a wire, or optoelectronically, for example by an optical fiber with associated semiconductor lasers and detectors acting as the optoelectronic convertors.

In a first design of the dither means in a SPM of the invention, the dither means is a physically separate component made out of piezoelectric material. Electrical leads are contacted to the piezoelectric dither block which is dithered, i.e. set into oscillatory motion, by applying an electrical dither drive input, such as a sinusoidally varying voltage from a standard signal generator. In this design of the dither means it is desirable that the piezoelectric dither block acts purely as a driving element and is not sensitive to the tip-sample interaction. Consequently, it is preferred in this design of the dither means that the piezoelectric material used for the dither means be ceramic, amorphous, polycrystalline or other similar material with poor mechanical oscillation properties, in particular over the frequency ranges used in operation. This will ensure that the dither block does not start to resonate in sympathy with a resonant oscillation of the mechanical parts of the piezoelectric oscillator arrangement, for example with a resonance of the tuning fork.

In a second design of the dither means in a SPM of the invention, a separate dither block can be dispensed with. Instead of using a separate portion of piezoelectric material to provide dither, the piezoelectric oscillator, e.g. the first oscillator means is used. In this case the dither means is integral with at least the first portion of piezoelectric material and comprises at least one electrical contact arranged on at least the first portion of piezoelectric material. To produce dither an electrical signal analogous to that described above in relation to the first design of the dither means is applied. This electrical dither drive input deforms at least the first portion of piezoelectric material thus setting the tip piece into oscillatory motion in the manner desired. In embodiments in which first and second oscillator means are made of piezoelectric material, in particular tuning fork embodiments and twin-bimorph embodiments, it is preferred that the dither means comprises one electrical contact arranged on the first portion of piezoelectric material (e.g. on the first prong of the tuning fork) and another electrical contact arranged on the second portion of piezoelectric material (e.g. on the second prong of the tuning fork). This ensures that the dither drive acts symmetrically.

It is noted that in the first design, the dither means does not have to be part of the head. In other words, since it is only relative tip-sample motion which is required from the dither, the dither means can be used to dither the sample instead of the tip. In contrast, the second design of the dither means with integral dither and oscillator means does not lend itself to dithering the sample.

The invention also relates to different ways of using a scanning probe microscope of the invention comprising a coupled oscillator arrangement.

In a first mode of use which is suitable for all embodiments of the SPM of the invention, in the absence of tip-sample interaction, the dither means sets the tip piece into oscillation relative to the sample at a dither frequency which is near to a resonance frequency of the coupled oscillator arrangement in a manner such that the coupled oscillator arrangement is responsive to the dither means, whereas, in the presence of tip-sample interaction, the coupled oscillator arrangement detunes so that said oscillations of the first and second oscillator means are disturbed thus changing the electrical signal obtained from the pick-up means.

In a second mode of use which is suitable for all the embodiments of the SPM of the invention which use the above-described first design of the dither means, in the absence of tip-sample interaction, the dither means sets the tip piece into oscillation relative to said sample at a dither frequency which is near to a resonance frequency of said coupled oscillator arrangement in a manner such that said coupled oscillator arrangement is not responsive to the dither means, whereas, in the presence of said interaction, said coupled oscillator arrangement responds to said oscillation produced by the dither means and rings thus changing said electrical signal obtained from said pick-up means. Thus this mode can be seen as representing the converse situation to the first mode, since the coupled oscillator only oscillates in the presence of tip-sample interaction. This second mode is particularly suited to embodiments in which the dither means drives the sample, but can also be used for embodiments in which the dither means drives the tip.

In a third mode of use which is suitable for the tuning fork ethodiments of the SPM of the invention, in the absence of said interaction, the dither means sets the tip piece into oscillation at a dither frequency by driving the tuning fork at a frequency near to a resonance frequency of the tuning fork so that the first and second prongs of said tuning fork perform mutually opposed oscillations, whereas, present said interaction, the tuning fork detunes so that said mutually opposed oscillations of the first and second prongs are disturbed thus changing said electrical signal obtained from the pick-up means.

Particular problems can arise when manufacturing the SPM of the invention due to the coupled oscillator arrangement. Namely, as a result of the provision of a coupled oscillator arrangement it can arise that the Q-factor of the oscillator is higher than desired. The fact that it is not generally desirable to have as large a Q as possible is perhaps not immediately obvious but is explained in detail below in the specific description. As a result of the very high Q-factors which I routinely achieve in the laboratory, I have developed techniques of reducing the Q-factor to a pre-calculated optimum design value.

The invention thus also relates to a method of manufacturing a scanning probe microscope, characterized in that said coupled oscillator arrangement has a quality factor, and in that prior to connecting the first oscillator means to the tip piece, this quality factor is substantially higher than that which is ultimately desired after completion of manufacture of the scanning probe microscope, and in that, subsequent to connecting the first oscillator means to the tip piece, said quality factor is determined and then reduced by adjustment of at least a first controllable parameter until said quality factor is approximately equal to a predetermined desired value.

The first controllable parameter can be the addition of doses of extra material, such as adhesive bonding material, to the first portion of piezoelectric material and/or, if present, to the second portion of piezoelectric material.

For embodiments in which the second oscillator means is an oscillator circuit, in particular an electronic circuit, said first controllable parameter is a resistance, inductance and/or capacitance of an adjustable electrical device which forms part of said oscillator circuit, such as a potentiometer, a tunable inductor, and/or a varactor respectively.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

The invention is now described by way of example only with the aid of figures which show:

FIG. 5A at rest; FIG. 5B oscillating in a resonance mode; and FIG. 5C off resonance;

FIGS. 6A and 6B Highly schematic diagrams of second and third embodiments of SPMs in accordance with the invention:

FIG. 6A Twin bimorph NSOM/FFM;

FIG. 6B NSOM/FFM with the first oscillator means being made of a portion of piezoelectric material and the second oscillator means comprising an electrical oscillator circuit;

FIG. 7A A tuning fork suitable for use with a separate dither block with one pair of contacts for the pick-up signal arranged on one face of the tuning fork (visible in the view on the right hand side) and with an earth or ground contact arranged on the reverse face of the tuning fork (visible in the view on the left hand side);

FIG. 7B A tuning fork suitable for use with a separate dither block with one pair of interwoven contacts for the pick-up signal (but no ground contact) wherein the white regions indicate bare quartz and the two grey shades the two interwoven contacts;

FIG. 7C A tuning fork with integrated dither means. The tuning fork has one pair of contacts for the pick-up signal arranged on one face of the tuning fork (visible in the view on the right hand side) and an earth or ground contact arranged on the reverse face of the tuning fork (visible in the view on the left hand side) as in FIG. 7A. However, there are additionally two dither contacts for receiving the AC electrical dither drive input;

FIG. 8A Pick-up signal as a function of dither frequency in the absence of tip-sample interaction;

FIG. 8B Pick-up signal as a function of dither frequency for different levels of tip-sample drag force ('friction') showing the effect that tip-sample interaction has on the tip oscillation. Points are measured, lines and fits calculated from a driven harmonic oscillator model;

FIG. 8C Pick-up signal as a function of dither frequency showing the effect that bonding the tip piece onto the tuning fork has on the oscillator properties of the tuning fork. The right-hand peak shows the tuning fork response prior to bonding the tip piece onto the tuning fork and the left-hand peak shows a similar response after bonding of the tip piece, i.e. in an assembled head;

FIG. 9A Topography image taken in FFM mode;

FIG. 9B Optical transmission image taken in NSOM mode;

FIG. 15 is a component table for two examples 4A and 4B of the circuit of the first embodiment and three examples 5A, 5B, and 5C of the circuit of the fifth embodiment;

DETAILED DESCRIPTION

Figure 4:
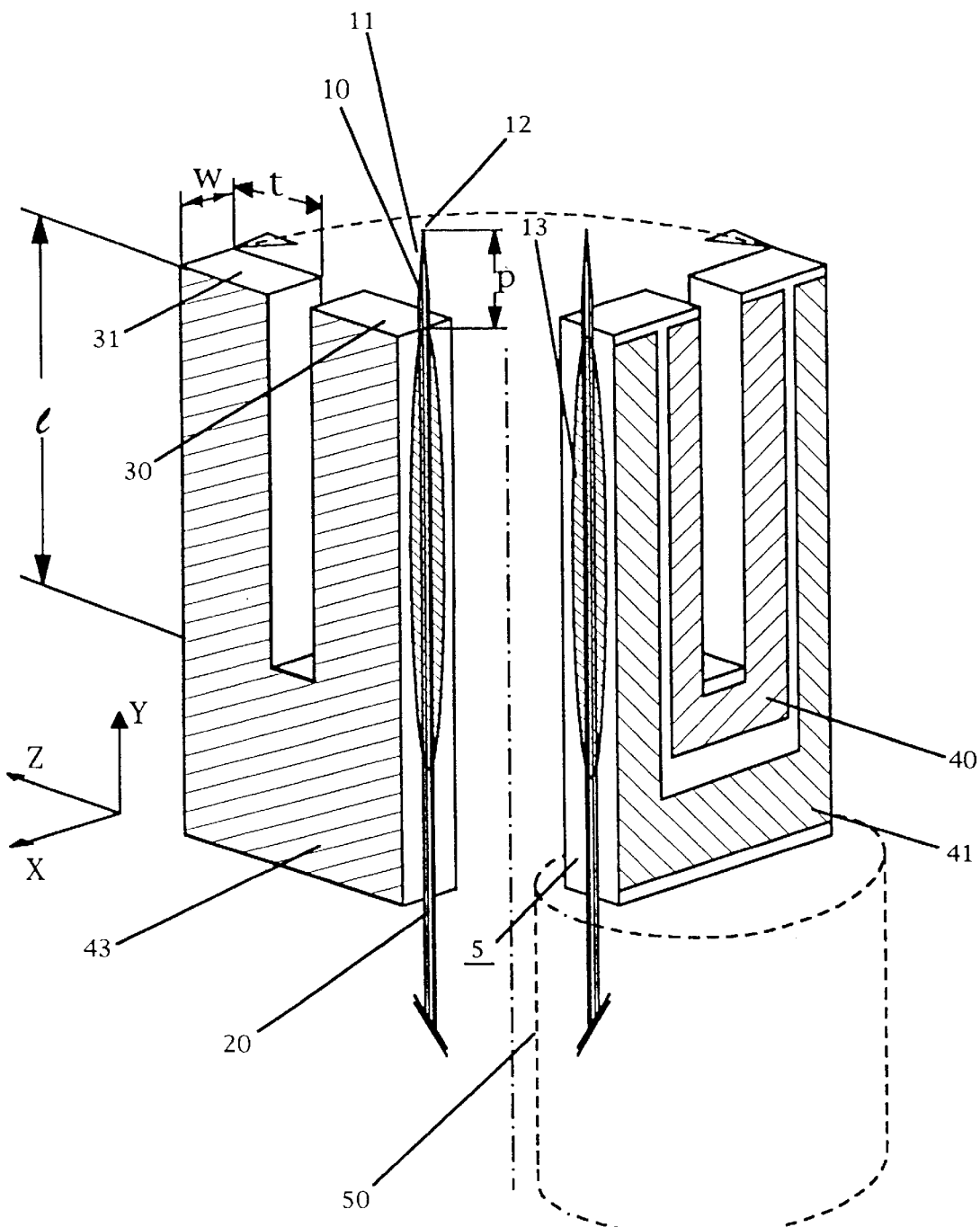
FIG. 4 Schematic close-up of the head of the SPM in accordance with the invention with two views one rotated 90 degrees with respect to the other.

FIG. 4 shows the SPM head in a first embodiment of the invention. A crystal quartz tuning fork 5 is attached to an optical fiber 20. The tuning fork 5 is attached to a cylindrically shaped dither block 50, shown by the dashed lines, made of ceramic piezoelectric material. The tuning fork 5 is a coupled oscillator with a first oscillator represented by the prong 30 and a second by the prong 31.

The end of the optical fiber 20 forms the tip piece 10. The tip piece 10 extends beyond the end of the tuning fork by a length 'p' which is typically chosen with a value of 0.5 to 1 millimeter. The tip piece 10 is preferably tapered in shape and has a narrow end. Tapering can for example be performed using standard optical fiber pulling techniques. The tip piece is preferably coated with a reflective layer of aluminum 11. The aluminum can be applied for example by using standard evaporation techniques. The end of the tip piece forms an optically transmissive aperture 12 through which the photons for near field optical microscopy can pass.

The optical fiber 20 is adhesively bonded along the length of one of side of the tuning fork with bonding means 13.

Contact Design

The tuning fork 5 has a pair of pick-up contacts 40, 41. In FIG. 4, and also FIG. 7A, the pick-up contacts 40, 41 are both arranged on one face of the tuning fork (visible in the view on the right hand side) and an earth or ground contact 43 is arranged on the reverse face of the tuning fork (visible in the view on the left hand side).

Figure 7A:
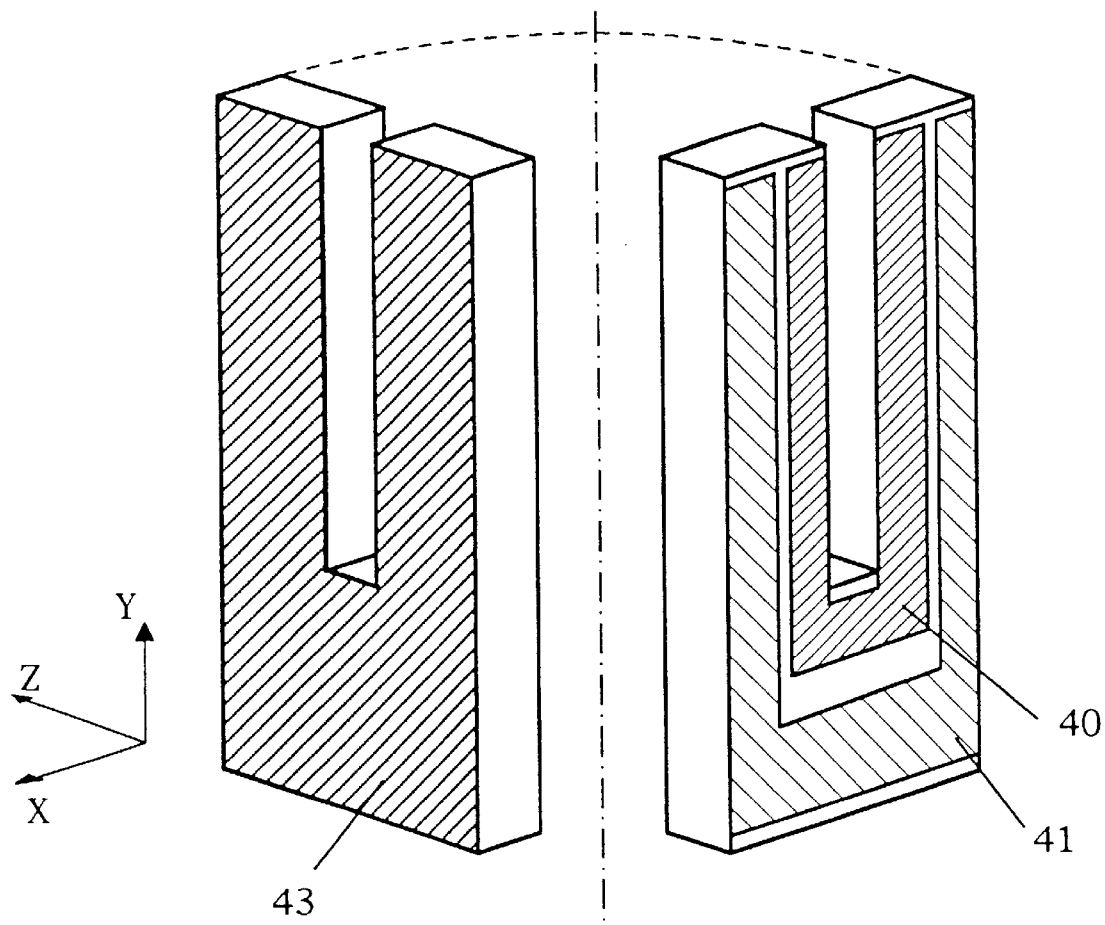
FIGS. 7A, 7B and 7C Schematic diagrams showing various tuning fork arrangements of the invention.
Figure 7B:
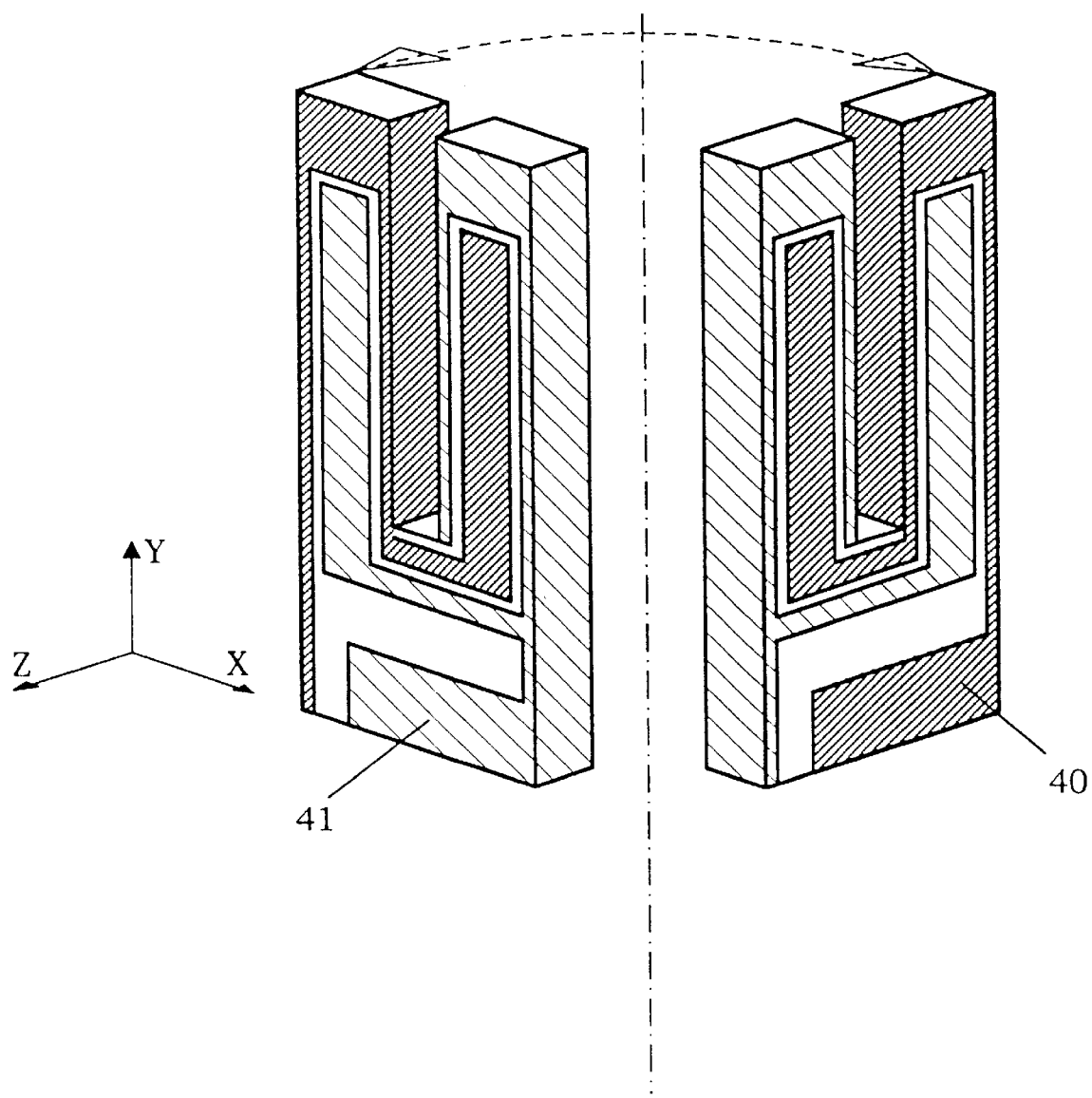

FIG. 7B shows one alternative arrangement for the contacts which is also suitable for a head with a separate ceramic dither block 50 of the type shown in FIG. 4. In this arrangement, the pick-up contacts 40, 41 extend onto both faces of the tuning fork through a rather intricate geometrical arrangement. The unshaded, white regions indicate bare quartz and the hatched regions the two interwoven contacts 40, 41. No ground contact 43 is provided. This contact arrangement is particularly efficient in converting deformation-induced piezoelectric charge into pick-up signal and is known from the electronics industry.

Figure 7C:
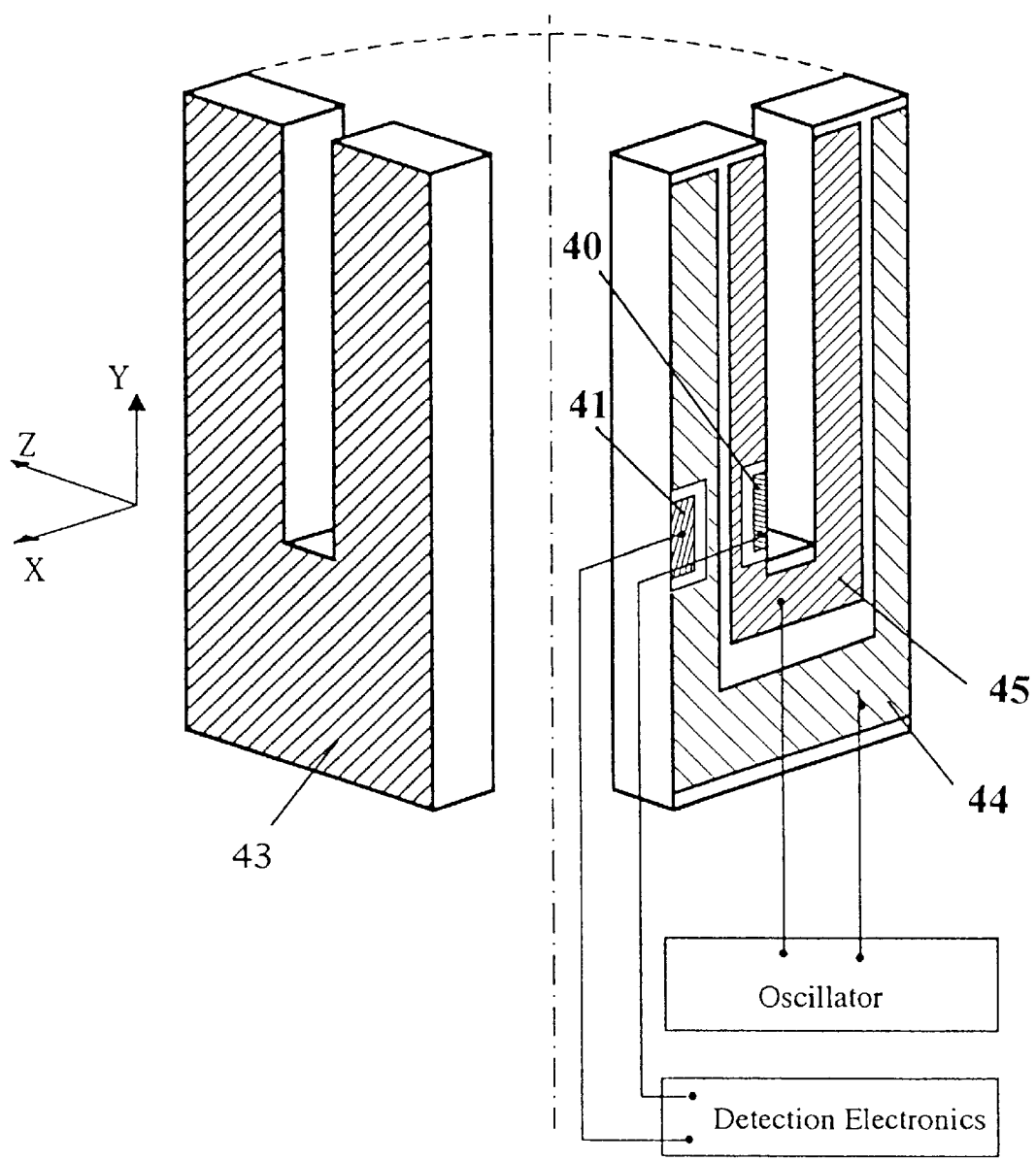

Another arrangement is shown in FIG. 7C in which two pairs of contacts are provided. Firstly, one pair of pick-up contacts 40, 41 and, secondly, one additional pair of contacts 44, 45. As explained below, these contacts 44, 45 actually represent the dither means with potential differences applied between contacts 44 and 45 resulting in deformation of the prongs of the tuning fork.

The pick-up contacts are arranged at the base of the prongs on the inner and outer sides respectively as these are the areas of maximum stress during vibration and thus deliver the largest pick-up signal. In other words the tuning fork performs a dual function in the dithering and sensing. The obvious advantage of this design is that a separate dither block as shown in FIG. 4 can be dispensed with, resulting in a yet compacter and simpler SPM. With this design it is desirable to keep the driving dither circuit and pick-up circuit as physically separate as possible in order to avoid capacitive coupling. The coupling between the circuits should be ideally purely piezoelectric.

Tuning Fork Design

The design of the tuning fork 5 itself is also very important for the performance of an SPM in accordance with the invention and is now discussed at length. Both the dimensions and the materials properties are important. An ideal tuning fork for SPM applications would have a high resonance frequency to allow rapid scanning of samples, a low compliance (i.e. spring constant) for its prongs, and produce a large piezoelectric response from a small deformation.

The parameters which enter into the design of a tuning fork for such applications are the dimensions of the prongs 30, 31, namely their length 'l', width 'w' and thickness 't', and the properties of the material used, namely its Young's (elastic) modulus 'E', density ρ, piezoelectric stress tensor $d_{ij}$, and crystal axes along which the tuning fork is formed.

If quartz is used, the directions X and Z shown in the figures represent the 'a' and 'c' axes of the hexagonal lattice basis of quartz (using conventional notation).

A convenient starting point for determining the dimensions of the tuning fork is to first select a desired value for the frequency 'f'. Typically a frequency of 10 to 100 kHz allows a good compromise between resolution and scanning speed, however, the choice is extremely dependent on the desired application.

For instance it may be acceptable to wait many hours for a single image in research applications, whereas a rapid measurement in minutes may be desirable for a commercial production environment. Moreover, the desired resolution of the image also varies hugely from application to application. In some applications atomic resolution is essential, i.e. of the order of 0.1 nanometers, whereas for others, for instance the checking of integrated circuits in the semiconductor industry, the relevant size scale maybe 0.1 micrometers, that is 1000 times larger. Further, the overall size of a typical image may be very different so that the number of picture elements will also vary by orders of magnitude.

A desired compliance '$k_{eff}$' at resonance for the prongs should also be chosen. A value of '$k_{eff}$' of the order of 1 Newton per meter or lower is generally desirable. This value is chosen since the typical effective spring constant for atoms bound to a solid are of the order of 10 Newtons per meter and, at least for imaging applications, one does not want the tip to break atomic bonds in the solid. Such a value for '$k_{eff}$' also ensures that the tip remains atomically sharp when scanned over a sample surface and does not pick up 'fluff', i.e. atoms from the sample itself Using the theory of the elastic deformation of materials I have derived the following formulae:

$$l = \frac{1}{2\pi f}\left(4\frac{k}{wE}\right)^{1/3}\sqrt{\frac{E}{\rho}}$$

$$t = \frac{1}{2\pi f}\left(4\frac{k}{wE}\right)^{2/3}\sqrt{\frac{E}{\rho}}$$

where 'k' is the static compliance and is related to the previously mentioned '$k_{eff}$' by the relation $k_{eff}=k/Q$ where 'Q' is the Q-factor or sharpness of the resonance defined as the ratio $f/\Delta f$ between the resonance frequency 'f' and its width '$\Delta f$'.

It is clear from the above formulae that the length 'l' is fixed by the materials parameters E and $\rho$ and the desired scanning properties f and k.

I now go on to discuss the other important factor, namely the electric field induced by deformation of the tuning fork. I have derived the following expression for the local electric field 'F'. This field has a value '$\delta F$' at each point (y,z) in the plane (Y,Z) defined by the contact electrodes 40, 41 which is given by the expression:

$$\delta F(y, z) = \frac{3}{\varepsilon_0 \varepsilon_S} d_{11} E \frac{(l-y)z}{l^3} \delta t$$

where '$d_{11}$' is the longitudinal piezoelectric constant of the crystal, '$\varepsilon_0$' is the dielectric constant in vacuum and '$\varepsilon$' the static relative dielectric constant of the piezoelectric material. I have assumed here that the piezoelectric crystal has tribunal or hexagonal symmetry but equivalent expressions can be derived in an analogous manner for other crystal types.

The pick-up signal voltage can now be approximated by the potential drop across the width 'w' occasioned by the electric field averaged under the whole area of each contact electrode and is given by:

$$\delta V = \frac{1.5}{\varepsilon_0 \varepsilon_S} d_{11} E \frac{wt}{l^2} \delta t$$

It can be seen from the above formulae that the width 'w' of the tuning fork can, to some extent, be chosen freely. In embodiments up to now, I have selected 'w' so that a typical dither-induced tip displacement of 0.1 nanometers results in an induced voltage in the microvolts range. A voltage of this order means that the pick-up signal remains easy to measure with standard instrumentation and is large enough that typical sources of interference do not cause any difficulties.

It is noted that the design formulae for other coupled oscillator arrangements, in particular those for which only a single portion of piezoelectric material are used can be readily derived in an analogous manner.

To give a feel for the parameters used, two examples are given below for heads incorporating tuning forks which are suitable for NSOM/FFM/AFM applications.

TUNING FORK EXAMPLE 1

A quartz plate is selected with a thickness of 100 micrometers and an orientation of (XYt)-5°, as denoted with the IEEE standard notation on piezoelectricity ANSI/IEEE Standard 176 (1987). Such an orientation gives high signal sensitivity. A tuning fork shape is cut out of this quartz plate with the dimensions: w=100 micrometers, t=300 micrometers and l=2.75 millimeters. The materials parameters were taken to be $E=6\times10^{10}N/m^2$, p=2 650 kg/m$^3$ and $d_{11}=2.31\times 10^{-12}$ Coulomb per Newton. The resulting tuning fork has a frequency, f=30 000 Hz and $k_{eff}$=1 N/m. Once the head is manufactured, specifically once the optical fiber is bonded to the tuning fork, a sharpness of Q=2000 was obtained. In general, use of the method of manufacture in accordance with the invention may be necessary to reduce Q to such a value after initial assembly of the head.

Note that it is the optical fiber 20 and not its tip piece 10 which is primarily responsible for the lowering of the Q-factor of the head in relation to the isolated tuning fork. Consequently, for AFM applications in which no optical fiber is necessary the head Q-factor approaches that of the bare tuning fork and can have a value of Q=10 000 or more in air.

The sensitivity of the tuning fork can be specified by the voltage induced on the contacts by an incremental deformation at the end of a prong of the tuning fork. The exemplary tuning fork has a value of $\delta V/\delta t$=93 millivolts per nanometer.

To give an idea of the practicality of such a response, a typical size of deformation at the end of the prongs produced by dithering is 5 picometers. This corresponds to an induced piezoelectric voltage at the contacts 40, 41 of approximately 10 microvolts. Note that I have assumed here that voltage is used as the signal parameter from the pick-up signal. However, other signal parameters of the pick-up signal can be used, for instance impedance.

Figures 5A, 5B, 5C:
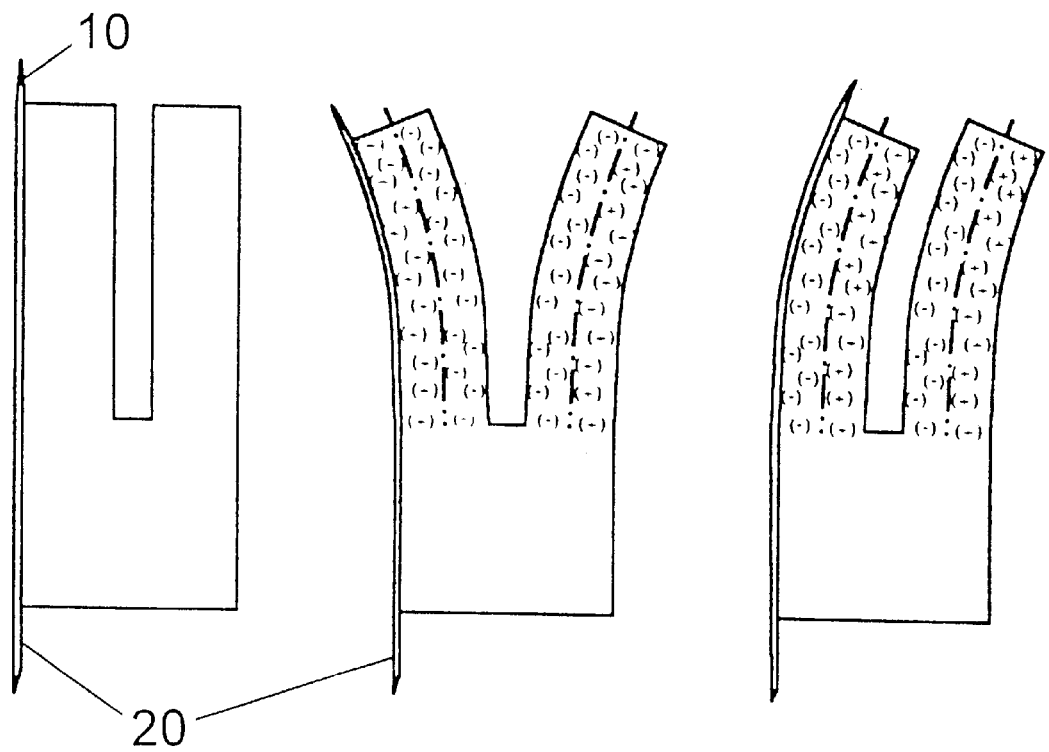
FIGS. 5A, 5B and 5C Schematic and highly exaggerated figure showing the charge distribution in a piezoelectric tuning fork wherein the dash-dot lines represent the planes of zero strain.

To appreciate the nature of the pick-up signal, FIGS. 5A, 5B and 5C are referred to. FIGS. 5A, 5B and 5C show, in a highly exaggerated fashion, the piezoelectric induced charge distribution over the prongs of a tuning fork for different deformations. FIG. 5A shows the distribution for zero flexure, i.e. at rest. FIG. 5B shows the situation for equal and opposite flexure of the two prongs of the tuning fork such as occurs when the tuning fork is dithered at its primary resonance frequency. FIG. 5C shows the situation when the two prongs flex together.

When using for instance the contact arrangement of FIG. 7A, the pick-up signal is almost zero for equal and opposite flexure (FIG. 5B) as the contributions from the two contacts cancel. The pick-up signal then rises in response to non-mirror-symmetric deformation of the prongs 30, 31 such as occurs when tip-sample interaction damps the prong to which the tip piece is attached. That is to say, the signal is a measure of the differential flexure of the two prongs with such a contact arrangement with maximum signal arising for exactly like flexure of the prongs as shown in FIG. 5C. This mechanism is in fact the mechanism which couples the mechanical oscillations of the two prongs of the tuning fork which, in turn, is the origin of the high Q-factors. The pick-up signal is typically used to keep the tip-sample interaction at a constant level when scanning by feeding it into appropriate regulation software/hardware.

TUNING FORK EXAMPLE 2

Quartz tuning forks are mass produced for the electronics industry. Quartz tuning forks with a principal oscillation frequency $f=2^{15}=32768$ Hertz are readily available. I have used one such tuning fork to build a SPM. The tuning fork has dimensions: l=3.9 millimeters, t=600 micrometers and w=400 micrometers. In the finished SPM, the head had a resonance sharpness of Q=3000. This results in a highly usable value for the compliance $k_{eff}=7$ N/m.

Head Response

Figure 8A:
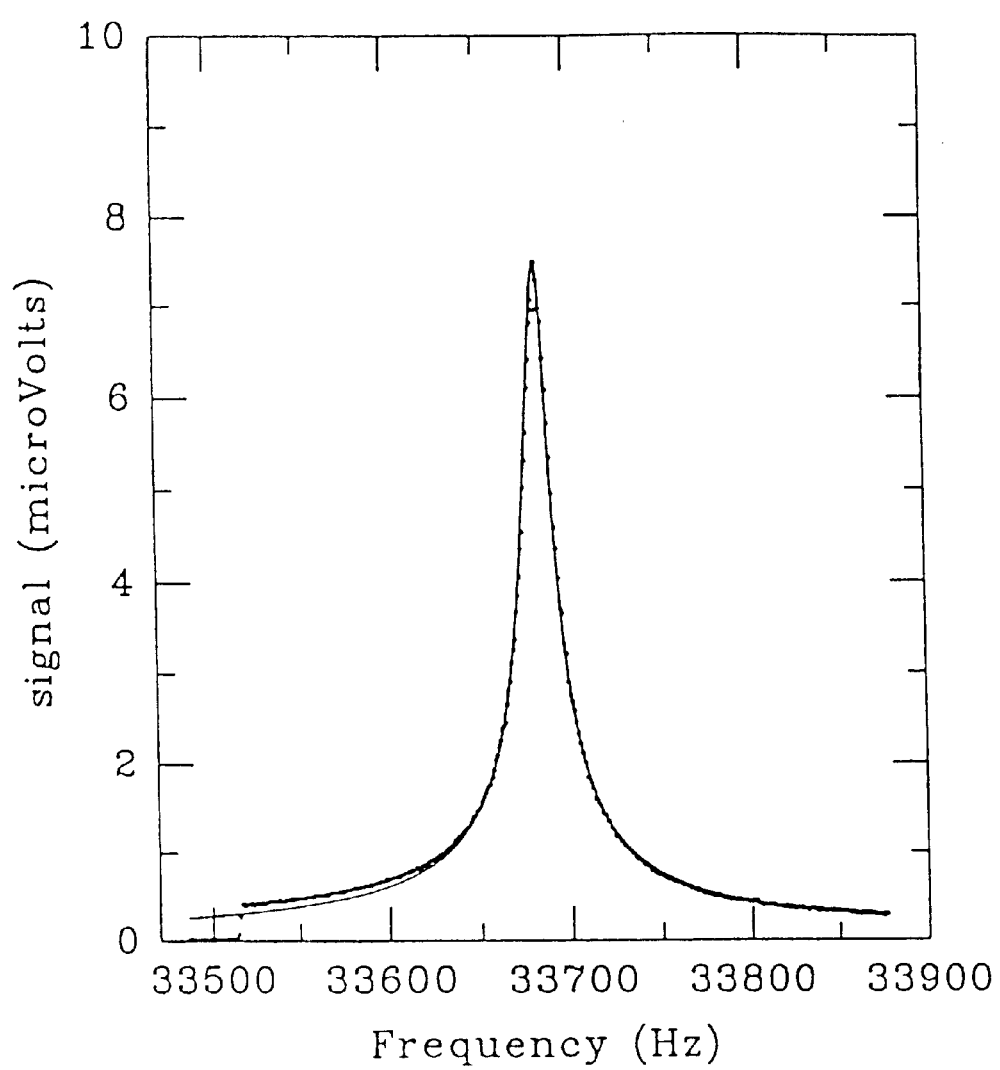
FIGS. 8A, 8B and 8C Showing various properties of SPMs using a tuning fork in accordance with FIG. 7B with an optical fiber attached to it in the manner of FIG. 4. In each case measurements of the pick-up signal as a function of dither frequency.
Figure 8B:
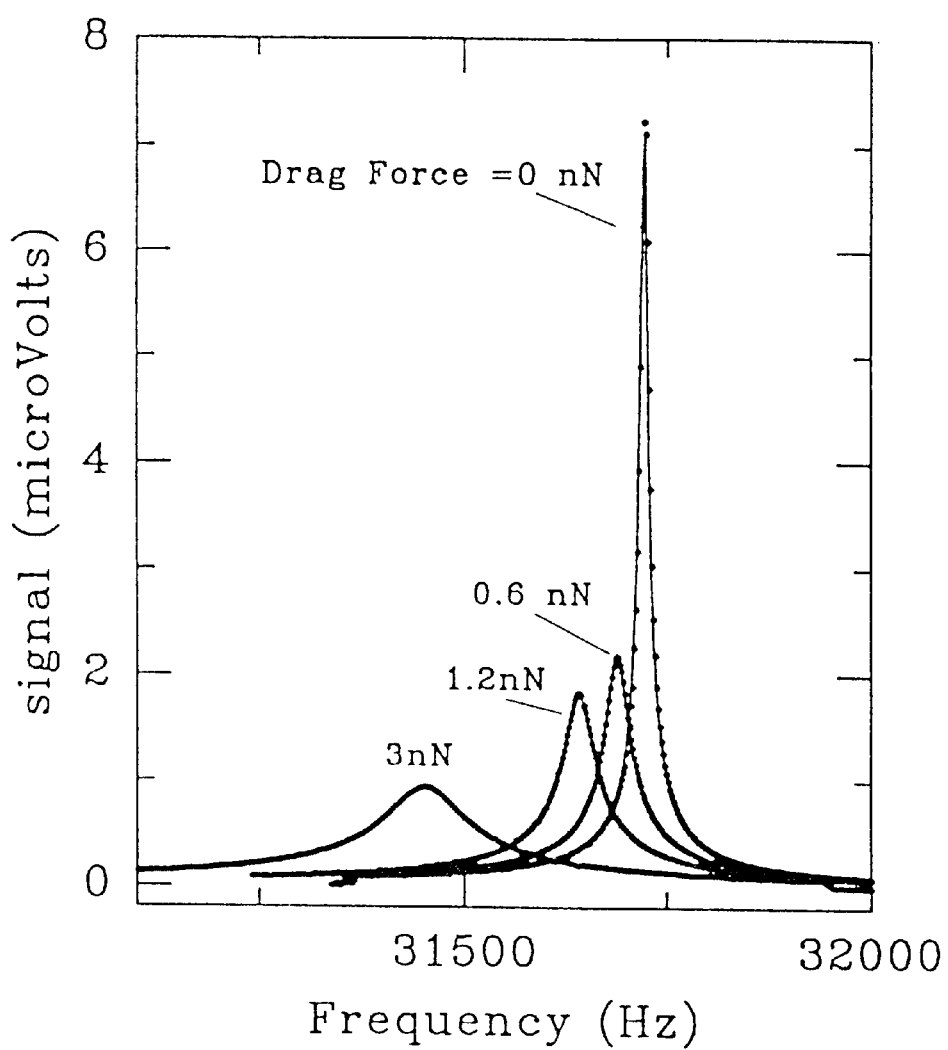
Figure 8C:
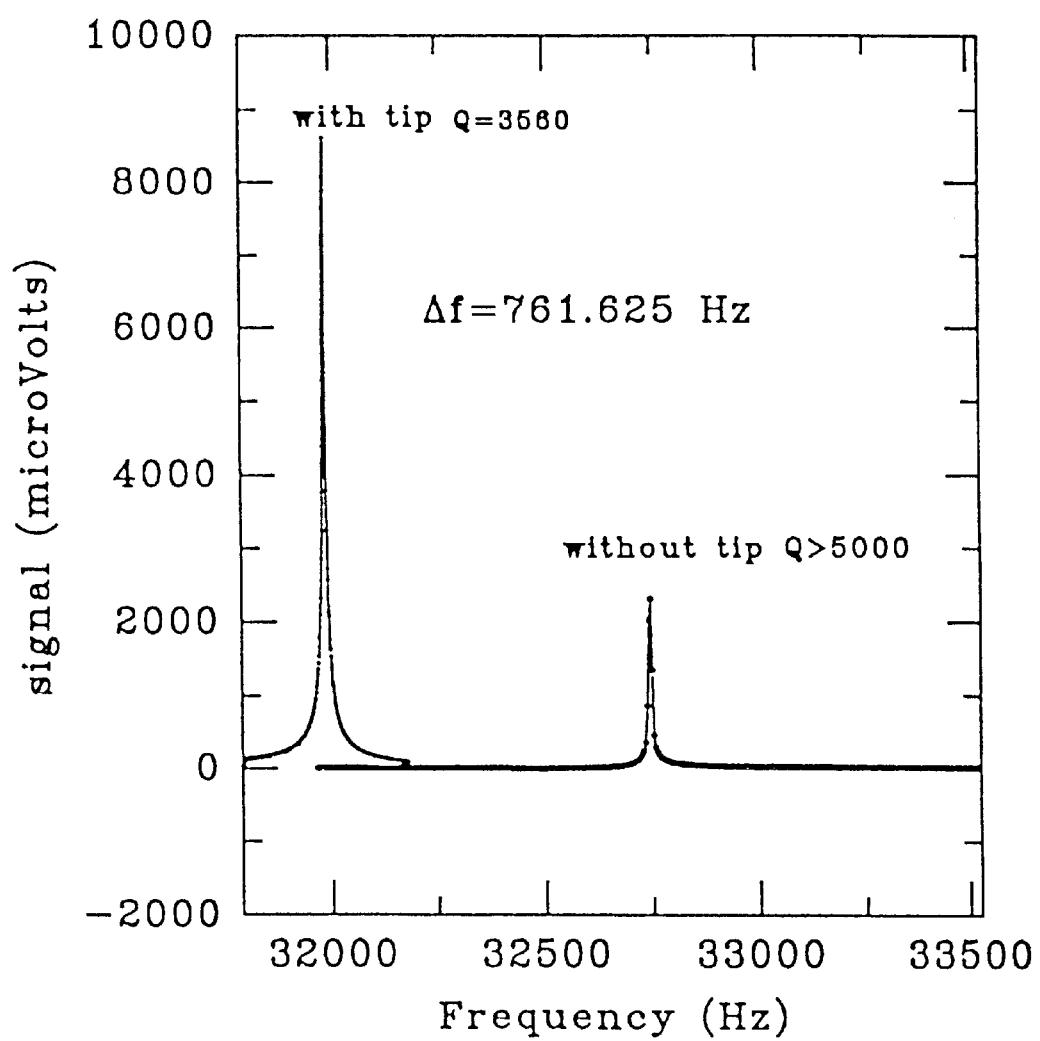

FIGS. 8A, 8B and 8C show signal as a function of dither frequency for an embodiment in which a head comprising a tuning fork in accordance with FIG. 7B is used. The tuning fork is attached to a ceramic dither block 50 of the type described in conjunction with FIG. 4. An optical fiber 20 is attached to the tuning fork in the manner shown, for example, in FIG. 4.

The signal measured is the amplitude of the AC voltage picked up from the contacts 40, 41, this signal being induced by the flexure of the prongs of the tuning fork as shown in FIGS. 5A, 5B and 5C.

In FIG. 8A, the pick-up signal is measured as the dither frequency is varied. The measurement was made in air with the tip piece well away from any sample, i.e. in the absence of tip-sample interaction. In the Figure, the points are measured data and the lines fits calculated from a driven harmonic oscillator model. The resonance frequency is measured to be 33683 Hertz and the Q-factor 1410. The frequency resolution is 1.94 Hertz. A peak signal of approximately 7.5 microvolts is measured.

I have found that it is important to select the free length 'p' of protrusion of the tip piece so that the resonance frequency of this free end is higher than that of the tuning fork. This ensures that tip-sample interaction forces are efficiently transferred to the relevant prong of the tuning fork. This is achieved by making the length 'p' sufficiently short. For example, a 'p' of less than 1 millimeter is preferred for an optical fiber with a diameter of 100 micrometers.

FIG. 8B shows the effect of tip-sample interaction on the head response. The highest, sharpest peak corresponds to the situation shown in FIG. 8A, namely no tip-sample interaction. The response is then measured with progressively increasing interaction. From right-to-left in the Figure the tip-sample drag force or 'friction' is measured at 0, 0.6, 1.2 and 3 nanonewtons, whereby the oscillations become increasingly damped. The points are measured data and the lines fits calculated from a driven harmonic oscillator model. Frequency resolution is 1.94 Hertz.

It can thus be seen that the signal at the peak frequency for no interaction is a sensitive measure of the degree of tip-sample interaction. Moreover, the frequency shift of the response peak with drag force is accompanied by a reduction in the Q-factor so that the signal at the peak frequency for no interaction remains measurable over a wide range of tip-sample drag force. Consequently, a simple, fixed frequency dither is still practical for an SPM in accordance with the invention.

In typical operation, the signal is used to maintain a constant tip-sample distance. Distances in the range of 0 to 200 nanometers are usual.

FIG. 8C shows the effect that bonding the tip piece onto the tuning fork has on the oscillator properties. The right-hand peak shows the tuning fork response prior to bonding the tip piece onto the tuning fork. The measurement system was not accurate enough to measure the Q-factor of the true peak signal value because the resonance is too sharp. However, a lower limit of 5000 can be placed on the Q-factor, this probably being a considerable underestimate. The left-hand peak shows a similar response after bonding of the tip piece onto the same tuning fork, i.e. in an assembled head. The Q-factor has reduced to a value of 3560. Frequency resolution 1.94 Hertz.

Tip-Sample Distance Regulation Mechanisms

The standard way of regulating tip-sample distance in SPMs is to use the amplitude of the signal, whether it be a tunnel current (STM), atomic force (AFM) or some other convenient scalar quantity in a feed-back loop with a piezo translator which controls the tip-sample distance. Such a way of operating is also suitable for SPMs in accordance with the invention.

However, I have developed another way of regulating tip-sample distance which I believe to be novel and which I therefore now describe in more detail in connection with a contact arrangement as shown in FIG. 7A. The tuning fork, or strictly speaking the head since the resonance frequency of the combined tuning fork and tip piece is different from that of the bare tuning fork, is driven on resonance by applying an AC voltage of the appropriate frequency across the contacts 40, 41.

The response of a tuning fork can be considered as electrically equivalent to a capacitance connected in series with a capacitance, inductance and resistance. Moreover, this impedance peaks at the resonance frequency of the tuning fork. Since tip-sample interaction affects the deformation of the tuning fork and induces detuning as shown for example in FIG. 8B, measurement of the impedance of the tuning fork is sensitive to the tip-sample interaction. It is thus possible to use the impedance to regulate the tip-sample distance. For instance, the tip-sample distance can be maintained at a distance defined by a constant impedance value.

Operation of SPMs with Integrated Dither

An SPM with a contact arrangement as shown in FIG. 7C can be dithered using an external drive circuit (not shown) by applying an AC dither drive input to the contacts 44, 45 with a frequency near to the resonance frequency of the tuning fork.

However, I have developed another way of producing dither for an SPM using a contact arrangement as shown in FIG. 7C which I believe to be novel and which I therefore now describe in more detail. The weak piezoelectric signal sensed by the pick-up electrodes 40, 41 is fed into a voltage amplifier 46 with adjustable gain and/or phase. The output of the amplifier is fed back to the contacts 44, 45 causing the fork to vibrate at its own inherent oscillation frequency. The tuning force is thus used as its own oscillator. The gain and phase of the amplifier are set so that the signal feeds itself in a closed loop.

This way of producing dither is especially advantageous when the resonance sharpness 'Q' exceeds a few thousand as it then becomes increasingly difficult to match an external drive frequency to that of the tuning fork. This is due to small frequency drift occasioned by temperature or pressure changes and also by shifts in the peak resonance frequency caused by tip-sample interaction as shown for example in FIG. 8B. Moreover, the reaction times for such a system can be made less than the oscillation period 1/f thereby allowing fast scanning.

Images

Figure 9A:
FIGS. 9A and 9B Images showing blood cells taken with an SPM of the invention, wherein both FIGS. 9A and 9B were taken simultaneously and wherein the image size is approximately 13 by 13 micrometers.
Figure 9B:

FIGS. 9A and 9B show images of blood cells taken with an SPM of the invention. The image size is approximately 13 by 13 micrometers. FIG. 9A is a topography image taken in FFM mode. FIG. 9B is an optical transmission image taken in NSOM mode. Both images 9A and 9B were taken simultaneously.

Figure 10:
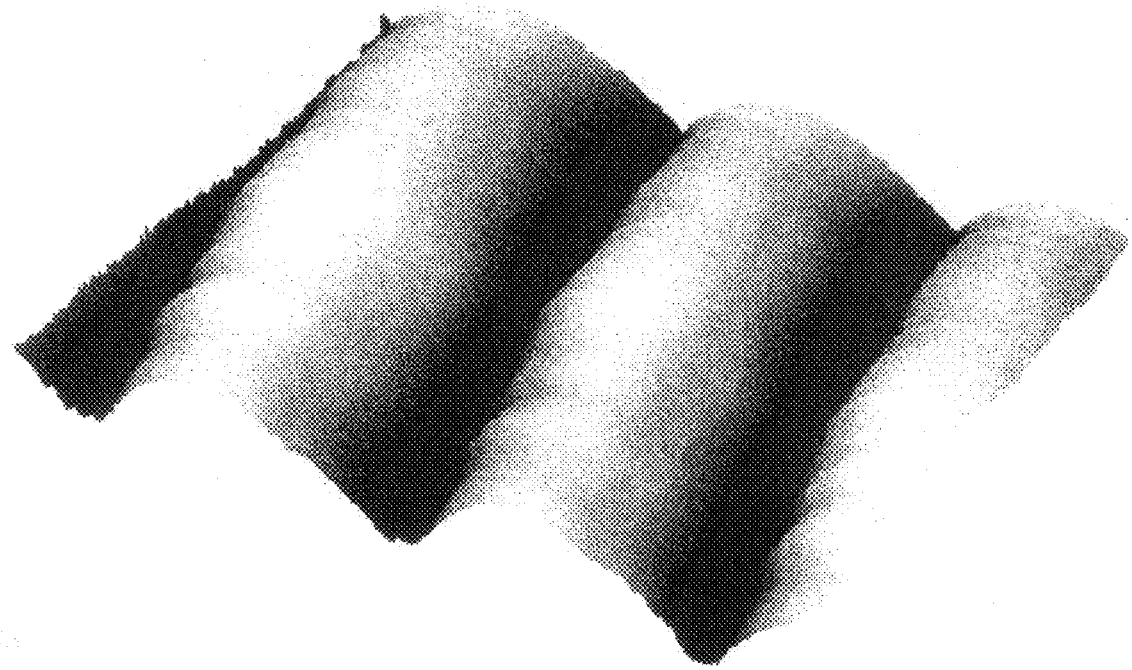
FIG. 10 Image of an optical grating formed on the surface of a piece of gallium arsenide single crystal taken in AFM mode. The areal image size is approximately 1 by 1 micrometer and the vertical scale, i.e. perpendicular to the gallium arsenide surface, has been expanded and amounts to only approximately 90 nanometers.

FIG. 10 is an image of an optical grating formed on the surface of a piece of gallium arsenide single crystal taken in AFM mode. The areal image size is approximately 1 by 1 micrometers and the vertical scale, i.e. perpendicular to the gallium arsenide surface, has been expanded for clarity and amounts to only approximately 90 nanometers.

These two examples were selected as they show the applicability of the SPM of the invention to both biological and semiconductor samples.

Second and Third Embodiments

FIGS. 6A and 6B show second and third embodiments of SPMs in accordance with the invention. The same reference numerals as in FIG. 4 and 7A, 7B and 7C are retained for analogous parts. Only some of the major parts are shown, since these Figures are primarily intended to show the principles involved.

FIG. 6A shows a second embodiment incorporating an optical fiber 20 in the manner of FIG. 4 but using a twin-bimorph coupled oscillator arrangement. Each arm is a bimorph bar comprising a first strip 30a, 31a of one kind of piezoelectric material bonded together with a second strip 30b, 31b of another kind of piezoelectric material. The individual arms are connected by electrically conducting wires (dashed lines) which serve to couple the mechanical oscillations of the respective arms. Pick-up contacts are not shown to avoid cluttering up the figure. In this embodiment the dither block 50 is placed under the sample S and the part 60 holding the bimorphs together is a simple mounting block. In other words in this embodiment the relative movement between tip and sample is produced by vibrating the sample instead of the tip. Such an arrangement is particularly suited to a mode of use whereby, in the absence of tip-sample interaction, the arms 30, 31 remain still, whereas tip-sample interaction causes the arms to ring, i.e. to start oscillating. To do this the dither frequency should be matched to the natural oscillation frequency of the coupled oscillator arrangement.

FIG. 6B shows a third embodiment incorporating an optical fiber 20 bonded to the piezoelectric arm 30 in the manner of FIG. 4. The arm 30 is a single piece of piezoelectric material. This is the first oscilator 30. Instead of using a second portion of piezoelectric material to form the second oscillator, an electrical oscillator circuit 31 is provided. The two oscillators 30, 31 are connected by electrically conducting wires (dashed lines) which serve to couple the mechanical oscillations of the arm 30 and the electrical oscillations in the circuit 31. The pick-up contact geometry is not shown to avoid cluttering up the figure. A comparable embodiment could be made wherein the first oscillator is not a single piece of piezoelectric material but a bimorph. An electrical oscillator circuit 31 is used as the second oscillator.

Fourth and Fifth Embodiments

The fourth and fifth embodiments include, as an additional component of the head, a signal processing circuit for receiving the electrical signal from the pick-up electrode on the piezoelectric element. An SPM comprising a head according to the fourth or fifth embodiments is the best mode of the invention currently known to the inventors. The circuit of the fourth and fifth embodiments serves to process the signal and deliver it from the head as an output signal for a signal amplifier. The signal processing circuit comprises a field effect transistor, the or a gate of which is connected to the pick-up electrode to receive the signal from the piezoelectric element.

Figure 11:
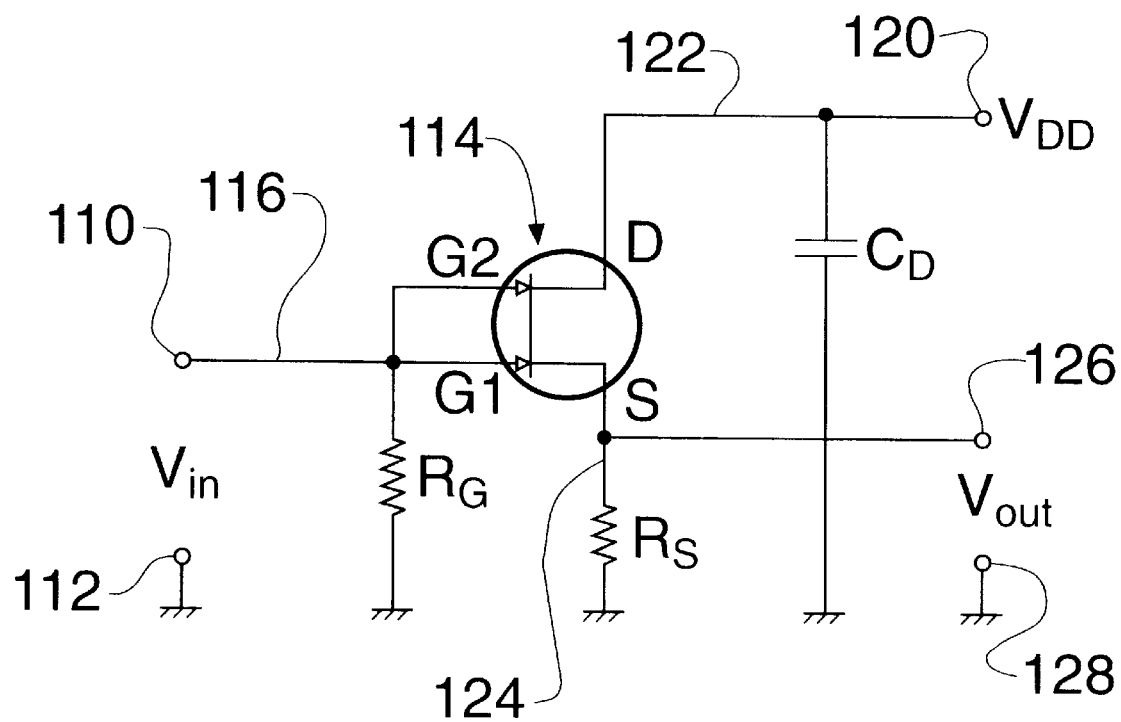
FIG. 11 shows a circuit diagram according to a fourth embodiment.
Figure 12:
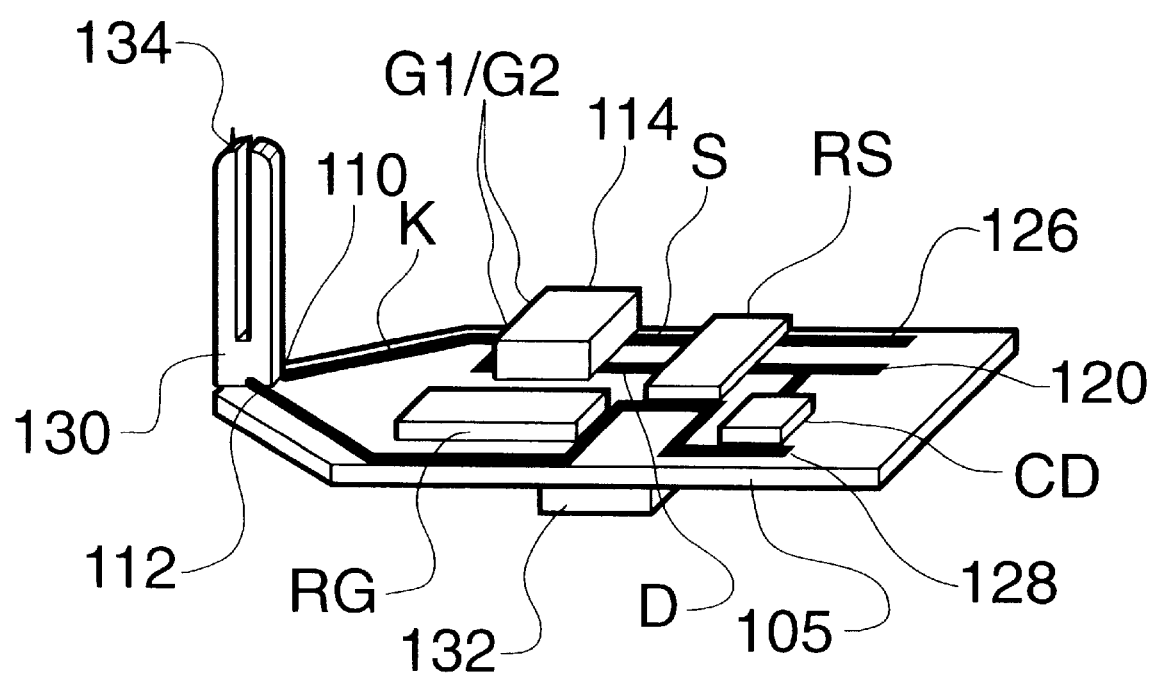
FIG. 12 shows a perspective view of a head for a scanning probe microscope according to the fourth embodiment.
Figure 13:
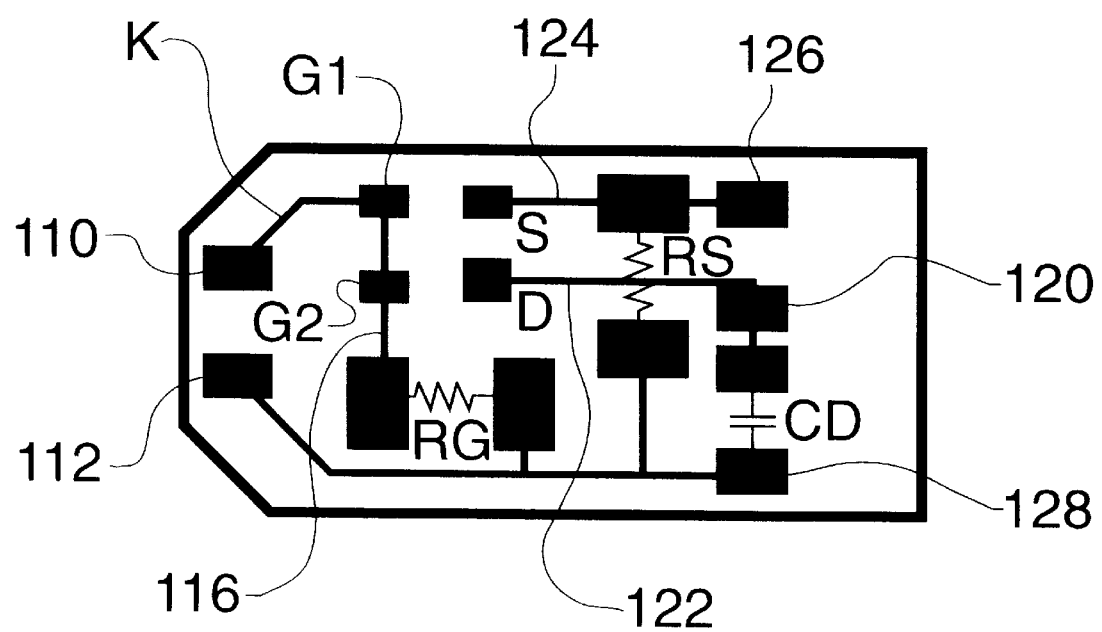
FIG. 13 shows in plan view the circuit board tracks of a circuit board for implementing the circuit of FIG. 11.

FIGS. 11 to 13 show details of an SPM head according to a fourth embodiment of the invention with FIG. 11 being a circuit diagram, FIG. 12 a schematic perspective view of the SPM head showing obliquely the underside of a populated circuit board bearing the circuit of FIG. 11, and FIG. 13 a plan view from underneath of the tracks on the circuit board of FIG. 12.

FIG. 11 shows a circuit diagram incorporated in an SPM according to a fourth embodiment of the invention in which two paired electrodes of a piezoelectric oscillator such as a tuning fork 130 (not shown in FIG. 11) are connected to terminals 110 and 112, terminal 110 being connected in parallel to gates G1 and G2 of a dual-gate field effect transistor (FET) 114 via a short conductive path 116 and terminal 112 being connected to earth. In operation, the tuning fork 130 is vibrated on resonance, and acts as a very small voltage source, supplying an AC signal of voltage Vin across the terminals 110 and 112.

A resistor RG having a resistance in the megaohm range is connected to the conductive path 116 on one side and on the other side to earth. The resistance of the resistor RG effectively defines the input impedance of the circuit since the gates G1 and G2 draw negligible current, and the major part of the input voltage Vin drops across it. Resistor RG also serves to protect the FET 114 from damage, and to filter out noise such as Brownian noise.

The drain D of the FET is held at a voltage VDD supplied to the circuit via a terminal 120 with a voltage of VDS dropping across the drain and source. The drain voltage input terminal 120 is connected to the drain D via conductive path 122, and also to earth via a capacitor CD. The capacitor CD serves to protect the FET from voltage spikes, for example when an external supply connected to terminal 120 is turned on or off.

The source S of the FET is connected by a conductive path 124 to a resistor RS having a resistance in the kiloohm range, the other side of which resistor RS is connected to earth. A voltage VS drops across the resistor VS where VDD=VDS+VS, it being understood that these voltages are principally static (DC) whereas the signal from the oscillator Vin is principally dynamic (AC). The source side of the resistor RS is connected via a conductive path to a terminal 126. A further terminal 128 connected to earth is provided. An output signal of voltage Vout is taken from the circuit is taken from across the terminals 126 and 128, where Vout is principally dynamic (AC) being the processed form of Vin which rides on a much larger static component equal to VS.

In one example of the circuit of FIG. 11, referred to in the following as Example 4A, an ultra-high frequency (UBF) gallium arsenide metal-semiconductor FET (GaAs-MESFET) with the item code 3SK166 is used. This MESFET is manufactured by Sony, and is an n-channel dual-gate MESFET with low noise characteristics. With reference to FIG. 11, the dual gates G1 and G2 are connected in parallel to receive the input signal. The resistor RG has a resistance of 10 megaohm, and the resistor RS has a resistance of 2.2 kiloohm. The capacitor CD has a capacitance of 47 nanofarrad.

A GaAs-MESFET has the advantage that the gate-source capacitance, and the gate-drain capacitance are low, the former being generally around an order of magnitude larger than the latter. Moreover, the gate-source capacitance will generally be lower the shorter the gate length, so that a FET with short gate length is preferred. Typically the gate-source capacitance is around 1 to 50 pF.

Although with a GaAs-MESFET 1/f noise can be considerable at lower frequencies, such noise by definition decreases as frequency increases, so that the use of tuning forks having a resonance frequency of at least 100 kHz is preferred when a GaAs-MESFET is used. A GaAs-MESFET is also preferred for low temperature applications at cryogenic helium temperatures (i.e. around or below 4.2 Kelvin). A GaAs-MESFET is also suitable for room temperature applications, as is also a silicon junction FET (Si-JFET). Most kinds of silicon FETs, including Si-JFETs, are however unsuited for use below around 60 to 70 Kelvin due to carrier freeze-out. Some types of silicon complementary MOSFETs could however prove to be suitable at temperatures below 60 Kelvin. In any case, at room temperature, the noise characteristics of commercially available Si-JFETs are generally superior to those of GaAs-MESFETs, especially at lower frequencies. A Si-JFET should thus be considered for room temperature use, especially when a low frequency tuning fork, e.g. 33 kHz, is used.

A second example of the fourth embodiment, referred to as Example 4B, thus has a Si-JFET with the item code 2N4416 manufactured by Siliconix. The circuit diagram is the same as that shown in FIG. 11 except for the fact that since this JFET only has one gate one of the gate contact lines of FIG. 11 is omitted. The resistor RS has a different resistance of 1.21 kiloohm. The other circuit components RG and CD are the same as for Example 4A.

FIG. 12 is a schematic perspective view of an AFM implementation of an SPM head according to the fourth embodiment, showing obliquely the underside of a circuit board 105 bearing the circuit with the tracks, terminal pads, and populated components of the circuit. The reverse side of the circuit board 105 (not visible) is metallized over its full area, and tied to earth as a safeguard against earth loops and pick-up noise.

The circuit board 105 is generally rectangular in shape, but with two chamfered end faces at one end, and has dimensions of 0.625 inches long by 0.312 inches wide and 0.125 inches thick (16×8×3mm). The circuit board may be of a conventional PCB material such as a glass-fiber epoxy. A ceramic circuit board, e.g. $Al_2O_3$, can also be used and is advantageous, especially for AFM or STM applications, owing to its mechanical rigidity and temperature stability. Its higher dielectric constant would however tend to increase parasitic capacitance somewhat.

At the left side of FIG. 12, a tuning fork 130 is shown, two interleaved electrodes of which (detail not shown) are soldered with bridging wires to the terminal pads 110 and 112. The tuning fork 130 has arranged thereon an AFM tip 134 extending from the end of one prong of the tuning fork 130, the tip being shown in highly exaggerated fashion in FIG. 12. The tuning forks used in the testing have been commercially available quartz tuning forks with 33 kHz and 100 kHz resonance frequencies. Other tuning forks with frequencies of up to 540 kHz are commercially available and could be employed.

Also shown in FIG. 12 is a ceramic piezoelectric oscillator 132 mounted on the reverse side of the circuit board 105. In use, the oscillator 132 is electrically driven in forced oscillation to generate vibrations which are mechanically transmitted to the tuning fork 130 via the circuit board 105 to set the tuning fork into resonant oscillation. The positioning of the oscillator 132 is not critical, all that is required is an adequate path for the mechanical oscillations generated by the oscillator to reach the tuning fork 130. For example, mounting the oscillator 132 anywhere on either side of the circuit board 105 is satisfactory. An alternative way of setting the tuning fork into resonant oscillation is to use the tuning fork to excite itself, in which case a separate oscillator, such as the ceramic piezoelectric oscillator 132 used in the fourth embodiment, is not required. Self-oscillation of a tuning fork is described further above in the section entitled "Operation of SPMs with integrated dither". Self-oscillation can be advantageous when SPM heads comprising forks or other piezoelectric resonators of frequency greater than say 100 kHz are used, when the Q-factor of the oscillator is very high such as is the case for low temperature operation or vacuum operation, when the medium in which the tip is to be scanned is of varying or unknown viscoscity, or when fast head scanning based on phase modulation such as with a phase-locked loop is desired.

FIG. 13 shows to scale the circuit board 105 from the side visible in FIG. 12 before population, and thus with the tracks evident, various points being labelled with the reference numerals used in FIGS. 11 and 12 so that the correspondence between these figures can be readily appreciated. The circuit components RS, RG and CD are also sketched in FIG. 13 for ease of comparson with FIG. 11.

Figure 14:
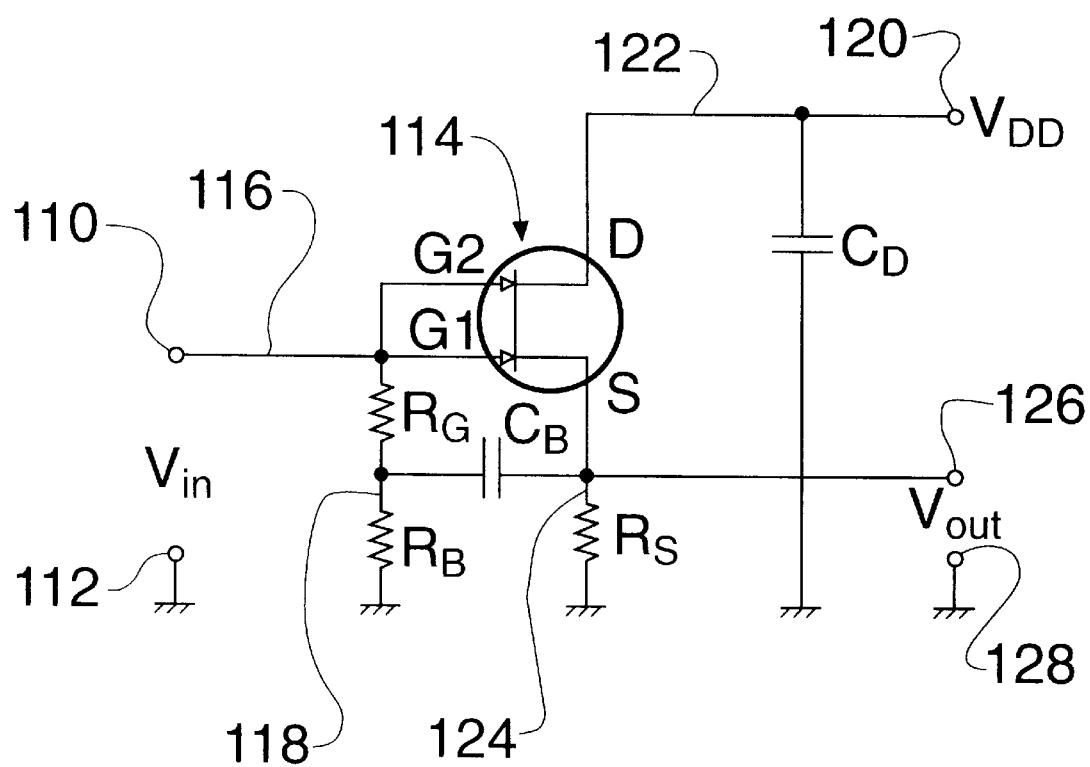
FIG. 14 shows a circuit diagram according to a fifth embodiment.

FIG. 14 shows a circuit used in an SPM head according to a fifth embodiment of the invention. The electrodes of a crystalline piezoelectric oscillator such as a tuning fork 130 (not shown in FIG. 14) are connected to terminals 110 and 112, terminal 110 being connected in parallel to the dual gates G1 and G2 of a field effect transistor (FET) 114 via a short conductive path 116 and terminal 112 being connected to earth, as in the fourth embodiment.

A resistor RG having a resistance in the megaohm range is connected to the conductive path 116 on one side, and on the other side via a further conductive path 118 to a further resistor RB having a resistance in the kiloohm range. The other side of the further resistor RB is earthed. Resistor RG also serves to protect the FET 114 from damage, and to filter out noise such as Brownian noise.

The drain D of the FET is held at a voltage VDD supplied to the circuit via a terminal 120. The drain voltage input terminal 120 is connected to the drain D via conductive path 122, and also to earth via a capacitor CD.

The source S of the FET is connected by a conductive path 124 to a resistor RS having a resistance in the kiloohm range, the other side of which resistor RS is connected to earth. The source side of the resistor RS is connected via a conductive path to a terminal 126. A further terminal 128 connected to earth is provided. An output signal of voltage Vout is taken from the circuit is taken from across the terminals 126 and 128.

Capacitor CB links the source and gate sides of the circuit as a bootstrap capacitor to provide positive feedback, and thus maximize the AC input impedance across the input terminals 110 an 112, noting that the bootstrap effect is frequency dependent owing to the high-pass filter formed by the bootstrap capacitor and resistor CB and RB.

FIG. 15 is a table showing the components used in the two Examples 4A and 4B of the circuit of FIG. 11 already discussed and the three examples of the the circuit of FIG. 14, these further examples being labelled 5A to 5C. In Example 5A, the same GaAs-MESFET as used in Example 4A is used, i.e. a Sony 3SK166. In Examples 5B and 5C, different UHF GaAs-MESFETs are used with item codes SGM2016P and SGM2006P respectively. These are also low-noise n-channel dual-gate MESFETs manufactured by Sony. It is also noted that the resistors are of the metal-layer type and the capacitors of the ceramic multi-layer type.

A general design goal of circuits of the fourth and fifth embodiments of the invention is to achieve an input impedance which is as large as possible. Since a piezoelectric oscillator can be considered to a good approximation as purely capacitive, the capacitance of the oscillator thus forms a capacitive voltage divider with the input capacitance of the source-follower circuit, so that the design goal should be the minimisation of the input capacitance of the source-follower circuit. In addition, the input resistance of the circuit forms a high pass filter together with the voltage source capacitance and the cut-off must be chosen so that it does not damp the eigenfrequency of the voltage source (33 and 100 kHz in the specific examples).

By reason of the above, the physical path 116 from the pick-up electrode on the piezoelectric oscillator to the gate or gates of the FET of the source-follower circuit should be kept as short as possible, since the parasitic capacitance of the connection line 116 can be expected to scale roughly proportionally with the the path length.

The fact that in the examples of the fourth and fifth embodiments both gates of the dual-gate transistors are connected up would appear to be contrary to this design principle, since it would appear to be beneficial to connect up only one of the gates. We have tried this, shorting the second gate G2 to the source, but the performance was inferior. This was owing to the fact that although the input capacitance of the circuit was decreased, the transconductance fell supraproportionally leading to a net worsening of performance.

Figure 16:
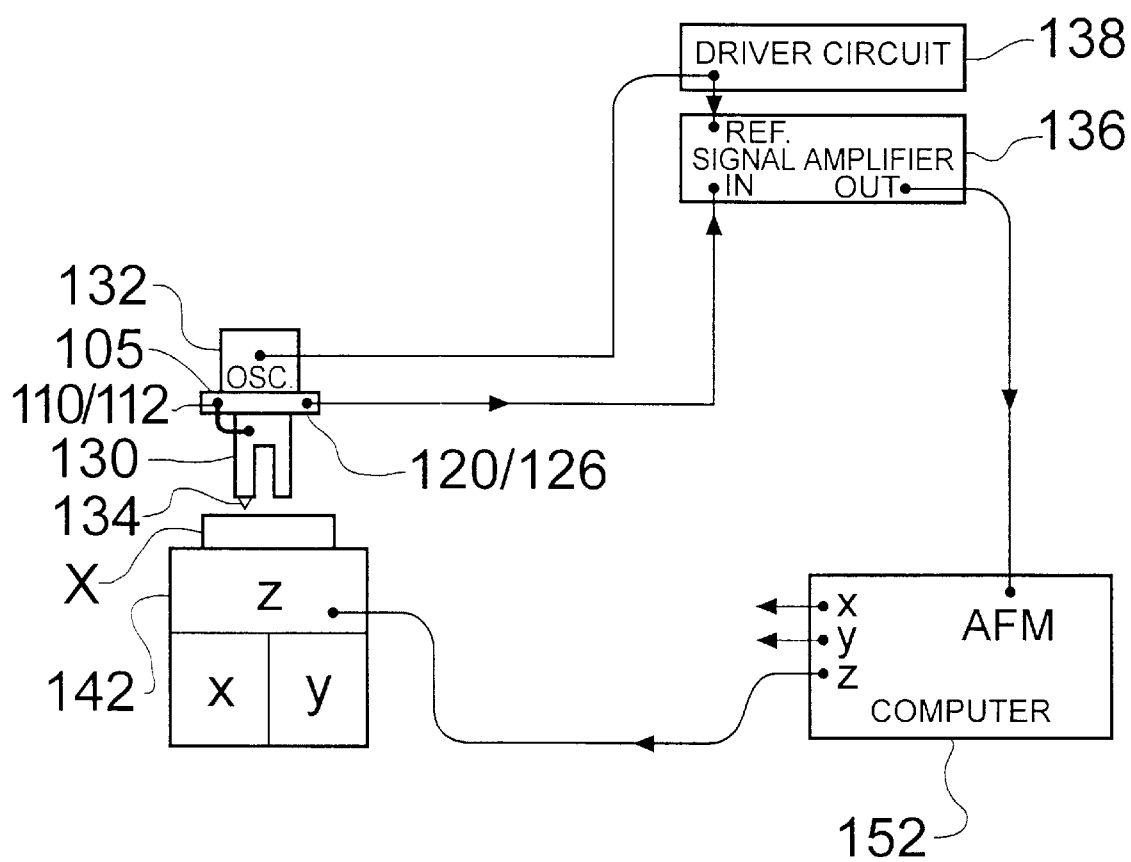
FIG. 16 shows a schematic view of an atomic force microscope (AFM) incorporating a head according to the fourth or fifth embodiment.

FIG. 16 is a block diagram showing schematically an AFM having an SPM head according to the fourth, fifth or further embodiments of the invention incorporating circuits as herein described. An SPM head having a tuning fork 130, circuit board 105 and oscillator 132 is shown. The tuning fork 130 is arranged such that its prongs extend substantially parallel to the axis of extension of the tip 134 so that when the tuning fork 130 is driven in resonance its prongs, and thus the AFM tip 134, will oscillate generally parallel to the plane of the sample X. The tip 134 is positioned by a three axis positioner 142 relative to a sample X, which positioner may include both coarse and fine positioners for one or more of the axes as is conventional in the art. The system control and the data collection, processing and display is coordinated by a computer 152. Also shown schematically are the electrical lines between the tuning fork 130, the circuit board 105 and the signal amplifier 136, for example a lock-in amplifier, and their associated inputs and outputs 110, 112, 120 and 126. The line supplying the drive signal to the oscillator 132, attached to the back of the circuit board 105, from a driver circuit 138 is also shown. The AFM tip 134 can for example be integrally formed with the tuning fork 130 on the end of one prong thereof. The AFM of FIG. 16 has the advantage that there are no optical components, unlike in a conventional cantilever AFM which requires optical detection to detect the cantilever deflection. An AFM can thus be provided which is very simple and robust in its construction.

Figure 17:
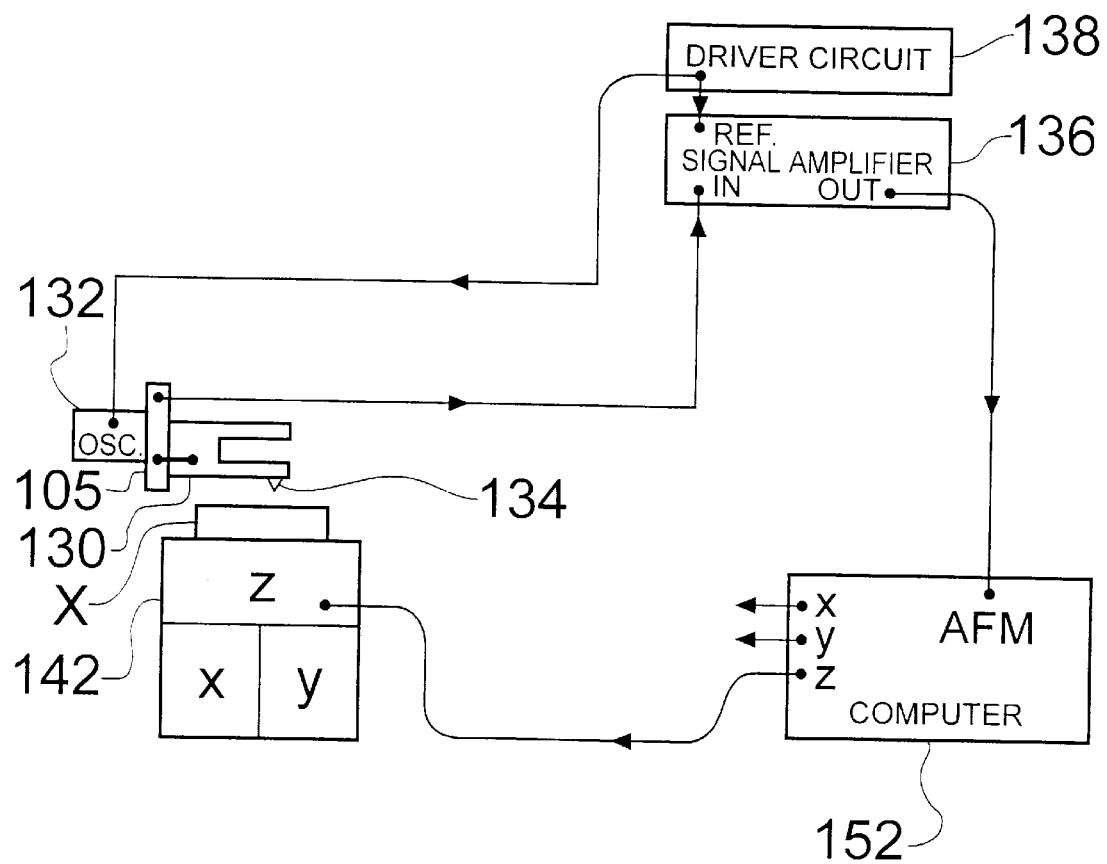
FIG. 17 shows a schematic view of another atomic force microscope (AFM) incorporating a head according to the fourth or fifth embodiment.

FIG. 17 is a block diagram showing schematically another AFM having an SPM head according to the fourth, fifth or further embodiments of the invention incorporating circuits as herein described. Reference numerals corresponding to those used in FIG. 16 are used. The arrangement of FIG. 17 is similar to that of FIG. 16 except that the tuning fork 130 is arranged such that its prongs extend substantially perpendicular to the axis of extension of the tip 134 so that when the tuning fork 130 is driven in resonance its prongs, and thus also the AFM tip 134, will oscillate generally perpendicular to the plane of the sample X, i.e. generally in the z-direction. The tip is formed on an outer side of a prong of the tuning fork 130, for example integrally formed, so that the tip 134 extends towards the sample X. The comments made in relation to FIG. 16 regarding the advantages in comparison to an optical cantilever AFM apply equally to the arrangement of FIG. 17.

Figure 18:
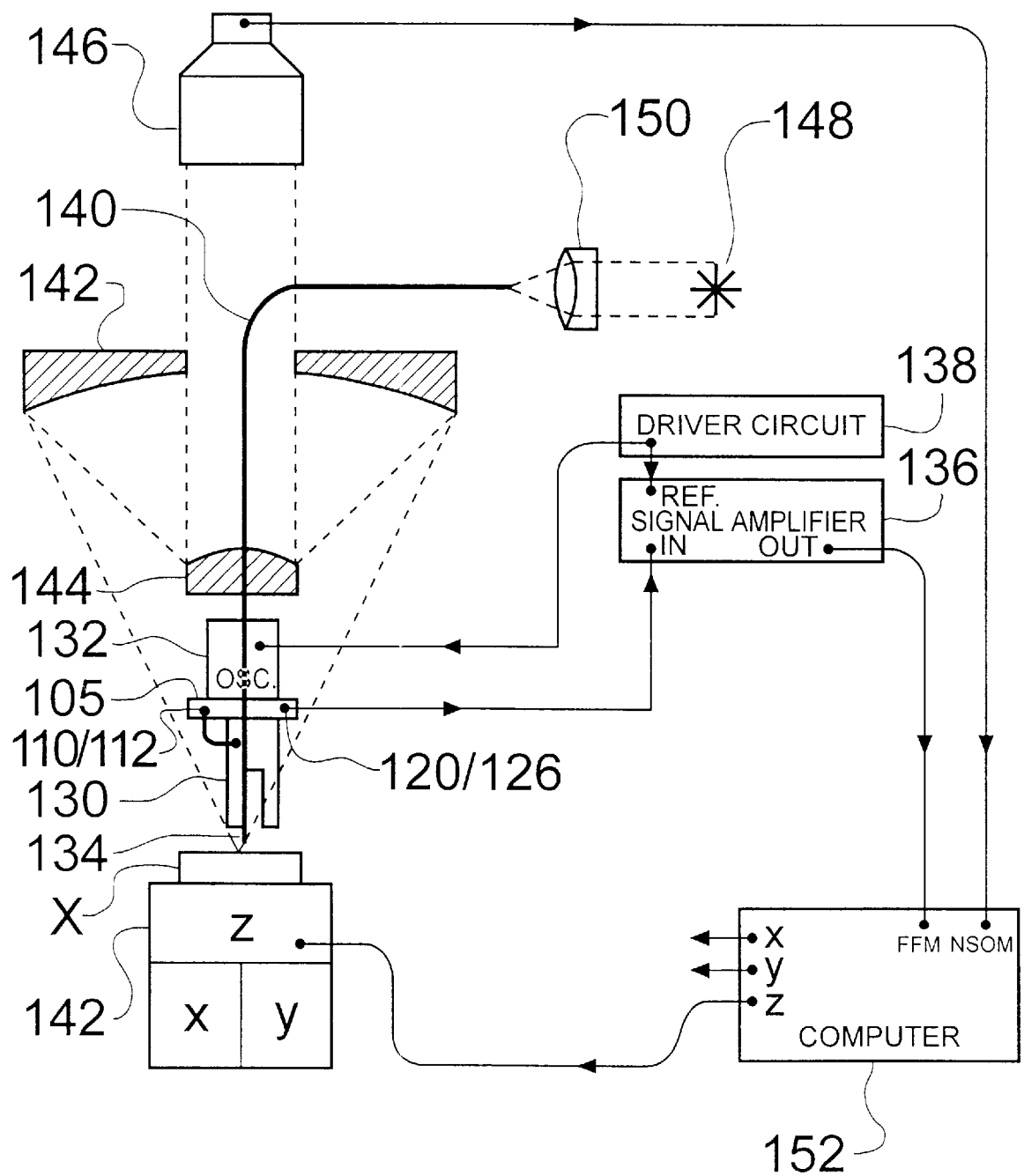
FIG. 18 shows a schematic view of a near-field scanning optical microscope (NSOM) incorporating a head according to the fourth or fifth embodiment.

FIG. 18 is a block diagram showing schematically an NSOM having an SPM head according to the fourth, fifth or further embodiments of the invention incorporating circuits as herein described. The NSOM head can be seen as corresponding to the AFM head of FIG. 16 in that the tuning fork 130 is arranged such that its prongs extend substantially parallel to the axis of extension of the tip 134 so that the NSOM tip 134 will oscillate generally parallel to the plane of the sample X. The tip 134 is the tapered, aluminum-coated end of a monomode optical fiber 140, a portion of which fiber 140 is held against one of the prongs of the tuning fork 130, for example by adhesive bonding, so that the fiber tip 134 follows the movement of the prong against which it is held. The NSOM head in this implementation is thus structurally the same as the AFM head shown in FIG. 12 except in respect of the tip. The sample X is excited by light emitted from the tip 34. The excitation light is generated by a laser 148 and is coupled into the fiber 140 by a fiber coupler 150. The optical signal from the sample X is collected in reflection mode by a mirror arrangement made up of an apertured concave mirror 142 and a convex mirror 144 for forming the light collected by the concave mirror 142 into a collimated beam directed through the aperture of the concave mirror 142 and onto a photomultiplier 146.

Figure 19:
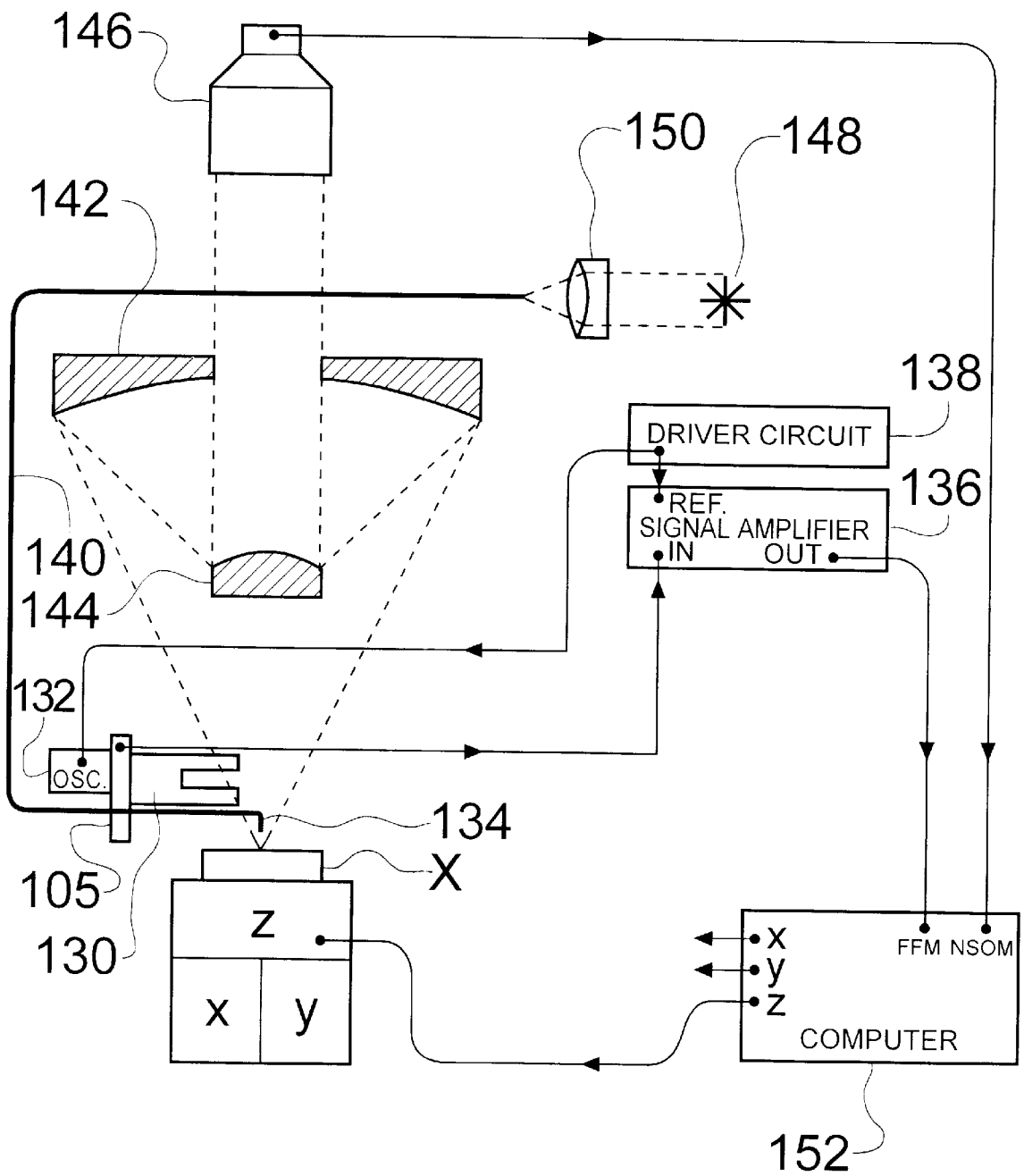
FIG. 19 shows a schematic view of another near-field scanning optical microscope (NSOM) incorporating a head according to the fourth or fifth embodiment.

FIG. 19 is a block diagram showing schematically another NSOM having an SPM head according to the fourth, fifth or further embodiments of the invention incorporating circuits as herein described. The NSOM head can be considered to be corresponding to the AFM head of FIG. 17 in that the tuning fork 130 is arranged such that its prongs extend substantially perpendicular to the axis of extension of the tip 134 so that the NSOM tip 134 will oscillate generally perpendicular to the plane of the sample X. The optical fiber 140 is held along one of the prongs of the tuning fork 130 as in the arrangement of FIG. 18, but is bent at right angles prior to the tip portion 134. The NSOM arrangement of FIG. 19 has the advantage that it is geometrically more similar to common cantilever AFM arrangements so that an NSOM head of this kind can be more convenient for fitment to an SPM designed for use primarily with cantilever AFM heads.

Figure 1:
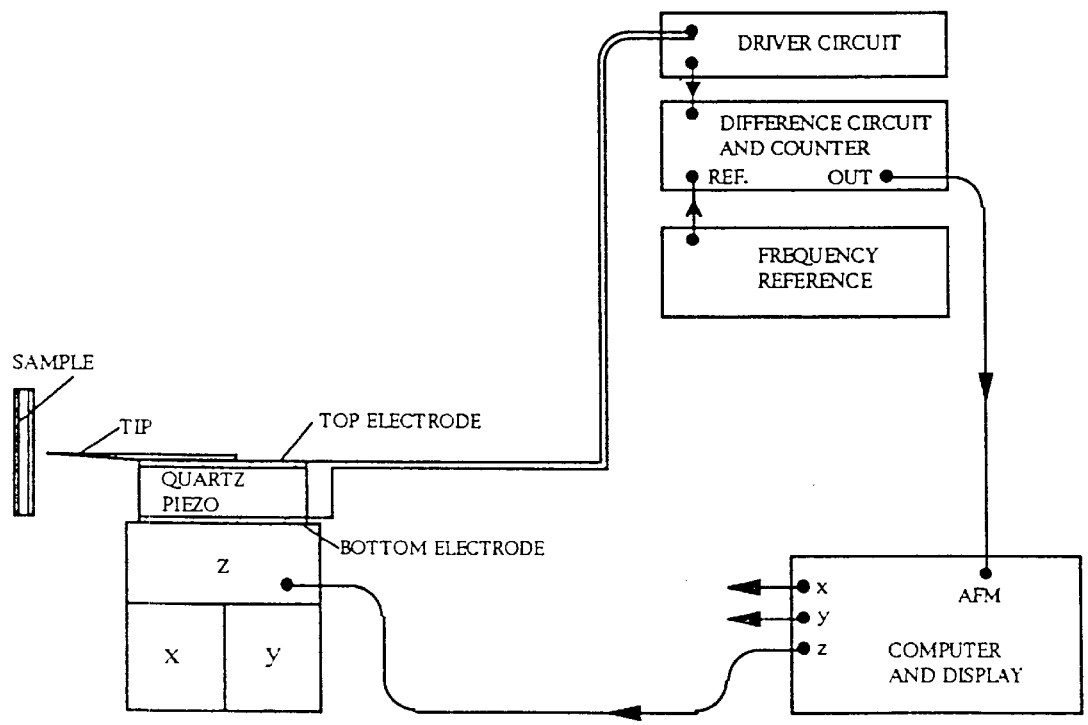
FIG. 1 Schematic block diagram of a prior art SPM in accordance with U.S. Pat. No. 4,851,671 which comprises electrical pick-up means.
Figure 2:
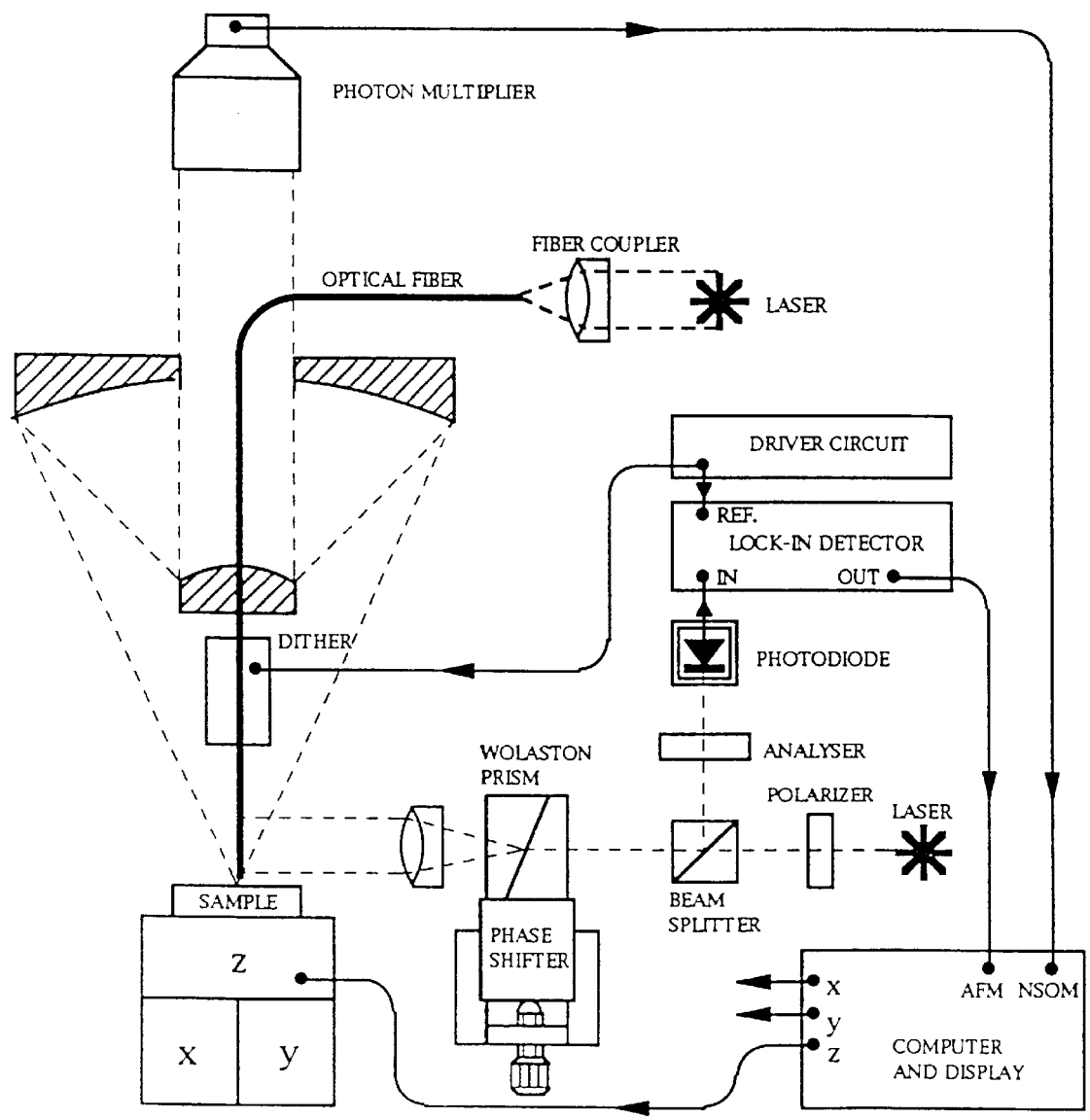
FIG. 2 Schematic block diagram of a prior art SPM in accordance with Toledo-Crow et al which comprises optical pick-up means.
Figure 3:
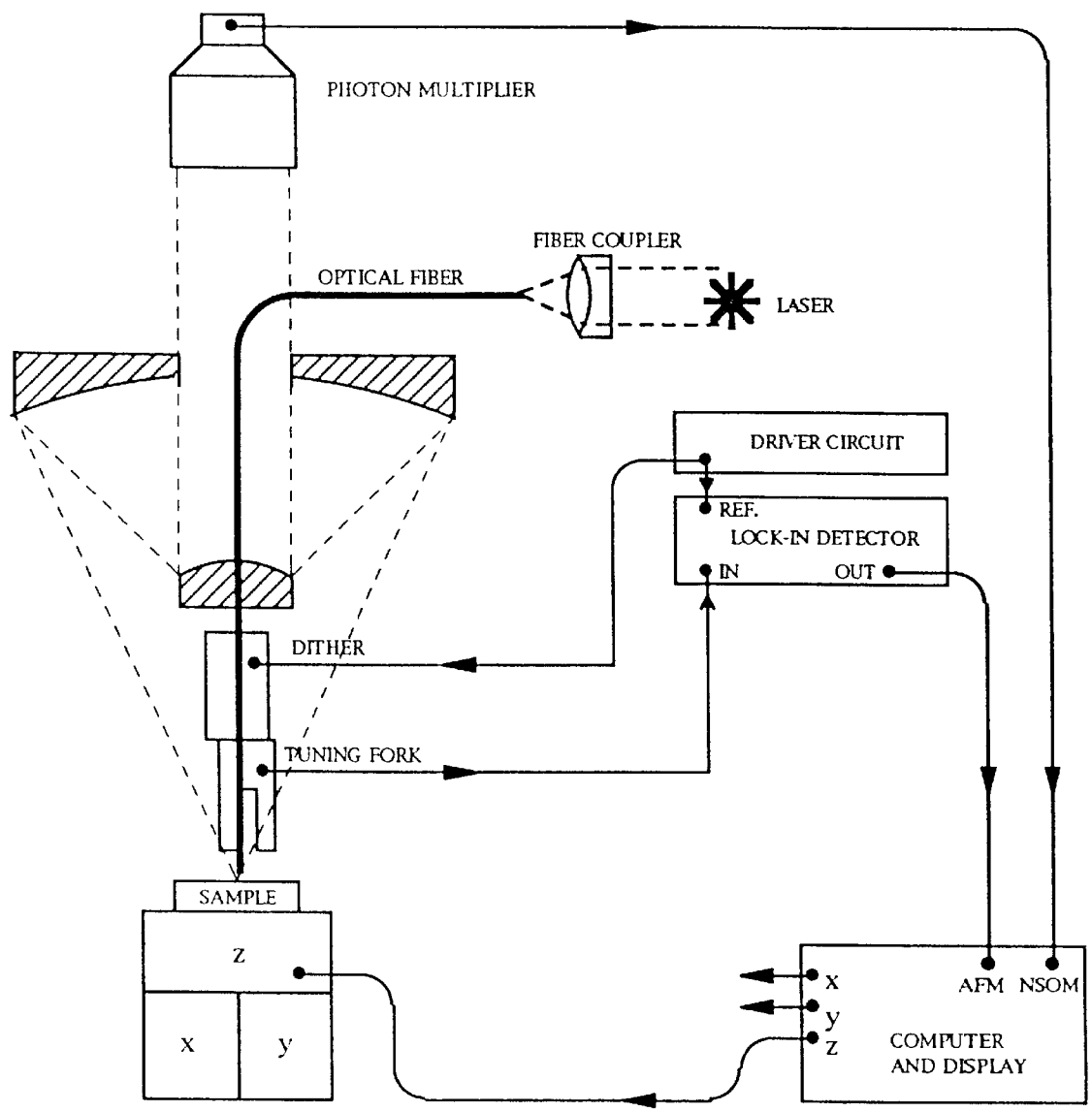
FIG. 3 Schematic block diagram of a SPM in accordance with the invention.

SPM heads according to fourth and fifth embodiments of the invention may for example employ the circuits described herein, but in conjunction with resonant piezoelectric elements other than tuning forks for oscillating the tip. For example, a circuit according to the fourth or fifth embodiments of the invention can be combined with an oscillating crystal SPM head as illustrated in FIG. 1, i.e. according to U.S. Pat. No. 4,851,671, for example with the top and bottom electrodes illustrated in FIG. 1 being connected across the terminals 110 and 112 of the circuits of the fourth or fifth embodiments. Crystalline piezoelectric oscillators of other shapes, for example hollow bars, are also commercially available and could be used. Such crystalline oscillators are most commonly made of single crystal quartz or silicon.

Figure 20:
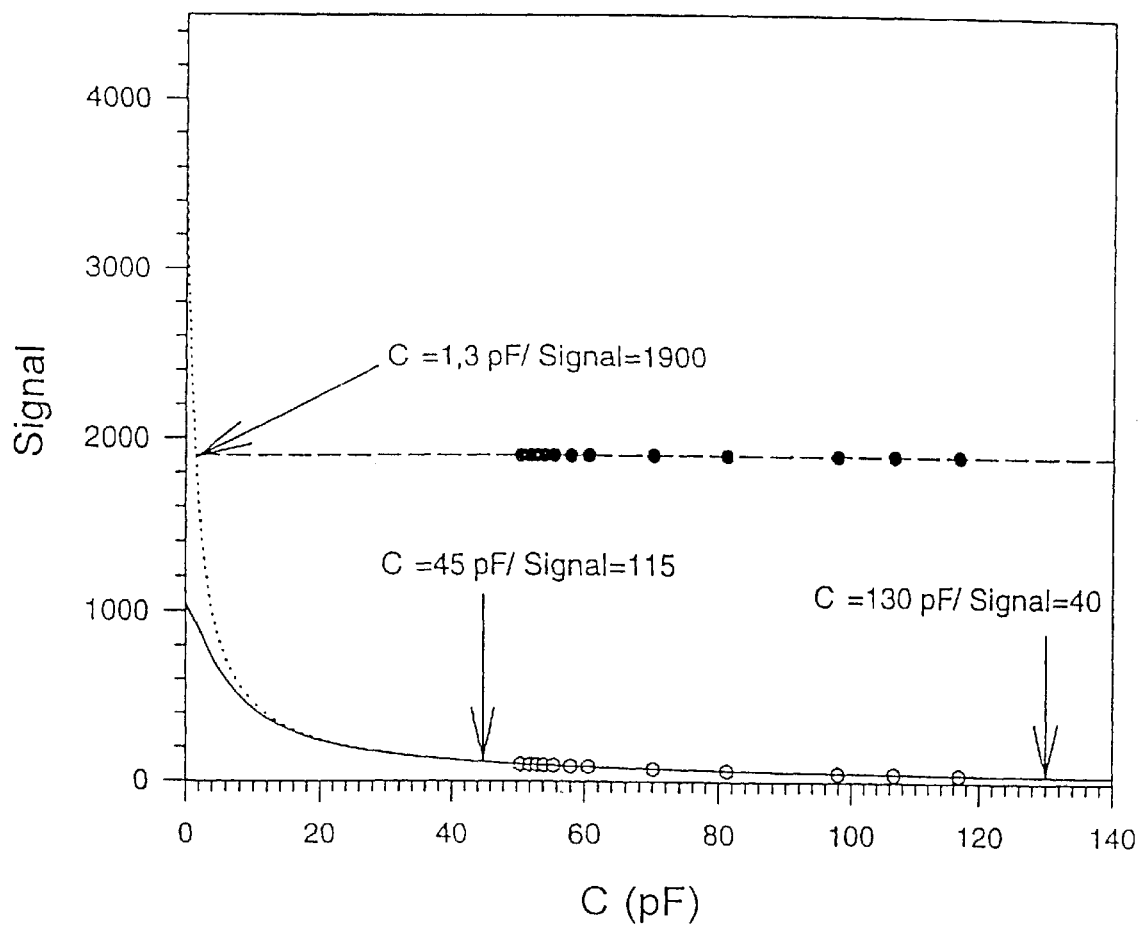
FIG. 20 is a graph showing the results of an experiment performed to compare the signal delivered by an SPM head according to Example 4A of the fourth embodiment (upper curve) and the signal delivered by a corresponding tuning fork based SPM head without the circuit of FIG. 11 (lower curve)

FIG. 20 is a graph showing the results of an experiment conducted to compare the performance of an SPM head according to Example 4A of the fourth embodiment and a 33 kHz tuning fork with the performance of an SPM head using the same tuning fork but according to the first embodiment, i.e. without the circuit shown in FIG. 11, in which the output signal is taken from the electrodes of the tuning fork to a cable and to the signal amplifier. In this experiment, to obtain the data points lying on the upper curve, capacitors of different capacitance in the range 50 to 300 picofarrad were connected across the output of an SPM head according to Example 4A of the fourth embodiment to simulate the parasitic capacitance associated with the coaxial cable which is, in typical use, connected between such an SPM head and a lock-in amplifier 136, such cable having an impedance of around 100 picofarrad per meter. Throughout the experiment, the tuning fork 130 was oscillated at 33 kHz with a peak-to-peak value of output voltage Vout from the SPM head of around 100 microvolts by applying an electrical signal of appropriate magnitude to the ceramic oscillator 132.

As can be seen from FIG. 20, the upper curve of the data points for Example 4A approximates very closely to a straight line at a constant signal level of around 1900 (arbitrary units). These results indicate that the signal level delivered by an SPM head according to Example 4A of the fourth embodiment to a lock-in signal amplifier will be unaffected by the lengths of coaxial cable typically used to interconnect them.

After collecting the data for the upper curve, the track 116 between the pick-up electrode of the tuning fork 130 and the gates of the FET 114 was severed with a scalpel at the position indicated with reference sign K in FIGS. 12 and 13. An output lead was then soldered onto the terminal pad 110 to take, what was previously the input signal Vin for the circuit of FIG. 11, as the output Vout, thus bypassing the circuit of FIG. 11.

The experiment was then repeated with the same set of capacitors of capacitance 50 to 300 picofarrad to collect the data points lying on the lower curve of FIG. 20.

As can be seen from FIG. 20, there is an orders of magnitude difference between the signal levels delivered to the signal amplifier with and without the FET circuit of FIG. 11, the difference becoming larger as the parasitic capacitance ("cable length") increases. The signal in arbitrary units is 115 and 40 with capacitances of 45 pF and 130 pF respectively, as compared with a signal of 1900 for the circuit of Example 4A irrespective o f "cable length". The responsivities of SPMs having an SPM head connected to the external signal amplifier with a cable of 45 pF and 130 pF are 0.14 and 0.058 mV/mn respectively, as compared with a responsivity of 2.1 mV/nm for Example 4A. The prong deflections that enter into the responsivity values were obtained from calibration measurements performed with a Normnanski interferometer and a conventional high-resolution optical microscope. These calibration measurements also show that prong deflection as a function of signal output from the tuning fork is linear over 5 or 6 orders of magnitude, the responsivity of the head being defined by the gradient of the function and being a measure of how much signal is delivered by the head for a given prong deflection.

The responsivity values can be considered in the light of the peak-to-peak deflections of interest for different SPM applications. For example, for an SPM in which atomic resolution is desired, the maximum allowable prong deflection needs to be between say 10 picometer and an Angstrom, under which conditions an SPM head according to Example 4A of the fourth embodiment would deliver a signal of 20 to 200 microvolts. Another example is an NSOM in which the maximum desired prong deflection should be less than say a quarter of the optical aperture diameter, i.e. less than 25 nm for a typical optical aperture diameter of 100 nm. This would translate into a signal of 50 millivolts for an SPM head according to Example 4A with a 33 kHz tuning fork.

Alternatively, the responsivity values can be considered in the light of the force of the interaction between tip and sample that is detectable. In the case of the SPMs according to FIGS. 16 or 18, this force will be the shear force which needs to be induced by the oscillating tip on the sample under study to produce a topography image or a near-field optical image respectively, bearing in mind that the NSOM of FIG. 18 relies on force detection for its tip-sample distance regulation. The shear force FS is proportional to the prong deflection x and is given by the equation $FS=(kx/Q\sqrt{3})(1-V/V0)$ where k is the spring constant or stiffness of the arm of the tuning fork to which the the tip is attached, Q is the quality factor of the tuning fork, V is the amplitude of the signal output from the SPM head in the presence of the regulated level of tip-sample interaction (i.e. during scanning) and V0 is the amplitude of the signal output from the SPM head in the presence of no tip-sample interaction (i.e. with the tip well away from the sample). When interpreting the above equation, it should be borne in mind that the most usual scanning mode will be scanning to maintain V constant. With the fourth and fifth embodiments of the invention it is possible to construct an FFM or NSOM according to FIGS. 16 and 18 respectively in which V is maintained constant during scanning at a level which results in the exertion of a shear force on the sample of only 1 to 10 piconewton. The theoretical lower limit for a tuning fork arrangement is given by the Boltzann noise and is around ⅓ piconewton for a stiffness k=23600 and a temperature T=4.2K, corresponding to a displacement of around 50 femtometers.

The ability with the fourth and fifth embodiments of the invention to reduce the force exerted on the sample during scanning is of major practical significance for imaging soft samples such as biological tissue or liquid crystals. For example, it is considered that a force of around 20 piconewton is sufficient to tear bonds in a DNA molecule.

By the same token, the reduction in interaction force also results in a reduced force acting on the tip, which thus reduces the possibility of damaging the tip. Measurements of the inventor have demonstrated that with an NSOM of the kind shown in FIG. 18, a force of 2 nanonewton is sufficient to destroy the optical integrity of the tip aperture and a force of 40 nanonewton completely destroys the tip itself It is possible with the fourth and fifth embodiments of the invention to scan with forces well below 2 nanonewton so that tip damage can be avoided. For example with a head according to Example 4A in an NSOM as shown in FIG. 18, using a tuning fork with Q=400 and k=23600, oscillating the tuning fork to generate a usable output signal of Vout=100 microvolt and setting V/V0=0.7, the shear force of the interaction is only 0.5 nanonewton. Here it is noted that this NSOM example allows regulation to be set at between V/V0=0.6 to 0.9 corresponding to a tip-sample distance of around 10 to 20 nanometer.

By comparison, with an SPM head according to the first embodiment of the invention in which the signal is taken directly from the tuning fork, the measured responsivity is typically around 100 times less and the minimum achievable interaction force is thus 100 times greater.

Figure 21:
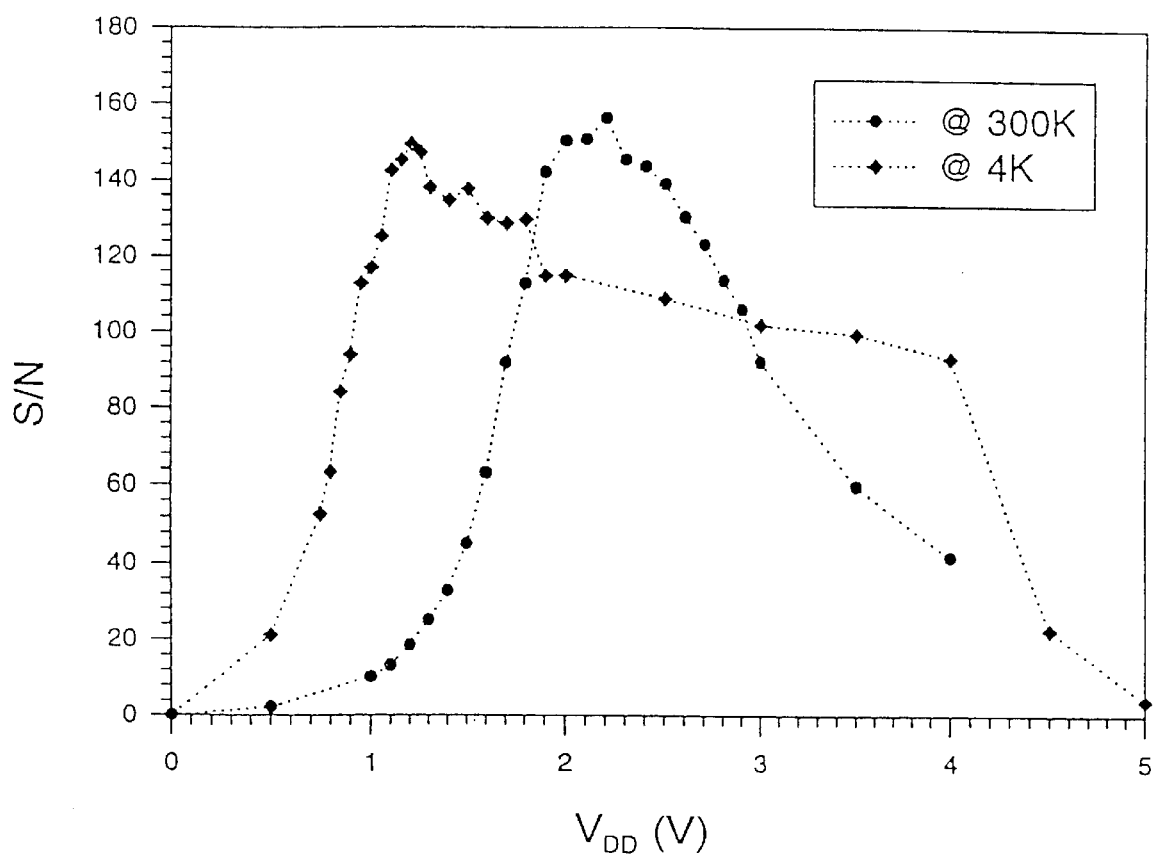
FIG. 21 shows the signal-to-noise ratio in arbitrary units as a function of bias voltage VDD of an NSOM head having the circuit of Example 4A and a 33 kHz tuning fork.

FIG. 21 shows the signal-to-noise ratio at 4.2 K and 300K of the output signal Vout as a function of bias (drain-earth) voltage VDD for an NSOM head of the kind shown in FIG. 18 having a circuit according to Example 4A and a 33 kHz tuning fork. The values were taken with Vin=100 microvolts. At both temperatures, there is a range of bias voltages VDD which give higher S/N ratios. At 4.2K the range of high S/N ratios is between about 1 and 4 volts with a peak at 1.2 volts and a fairly level plateau at intermediate values within the range. At 300K the range of high S/N ratios is between about 1.7 and 3 volts with a pronounced peak at around 2 to 2.3 volts and a gradual fall off to higher voltages.

The underlying reasons for the behavior shown in FIG. 21 can be understood from FIGS. 22 to 25 which show characteristic curves for the circuit of Example 4A at 33 kHz. FIGS. 22 to 25 also show characteristic curves of the other four examples of FIG. 15 with 33 kHz and 100 kHz forks. The data for the JFET example 4B was measured at 300 Kelvin and that for the MESFET examples at 4.2 Kelvin. Equivalent measurements have however been made at 4.2K for Example 4A with a 33 kHz tuning fork and the results (not shown) indicate no major change in the overall voltage gain characteristics. The principal noteworthy difference is the change in the optimum range of values for the bias voltage VDD, as already discussed above with reference to FIG. 21. The circuits of Examples 4B and 5B were tested at both 33 kHz and 100 kHz, the circuits of Examples 4A and 5A were tested only at 100 kHz and the circuit of Example 5C only at 33 kHz.

Figure 22:
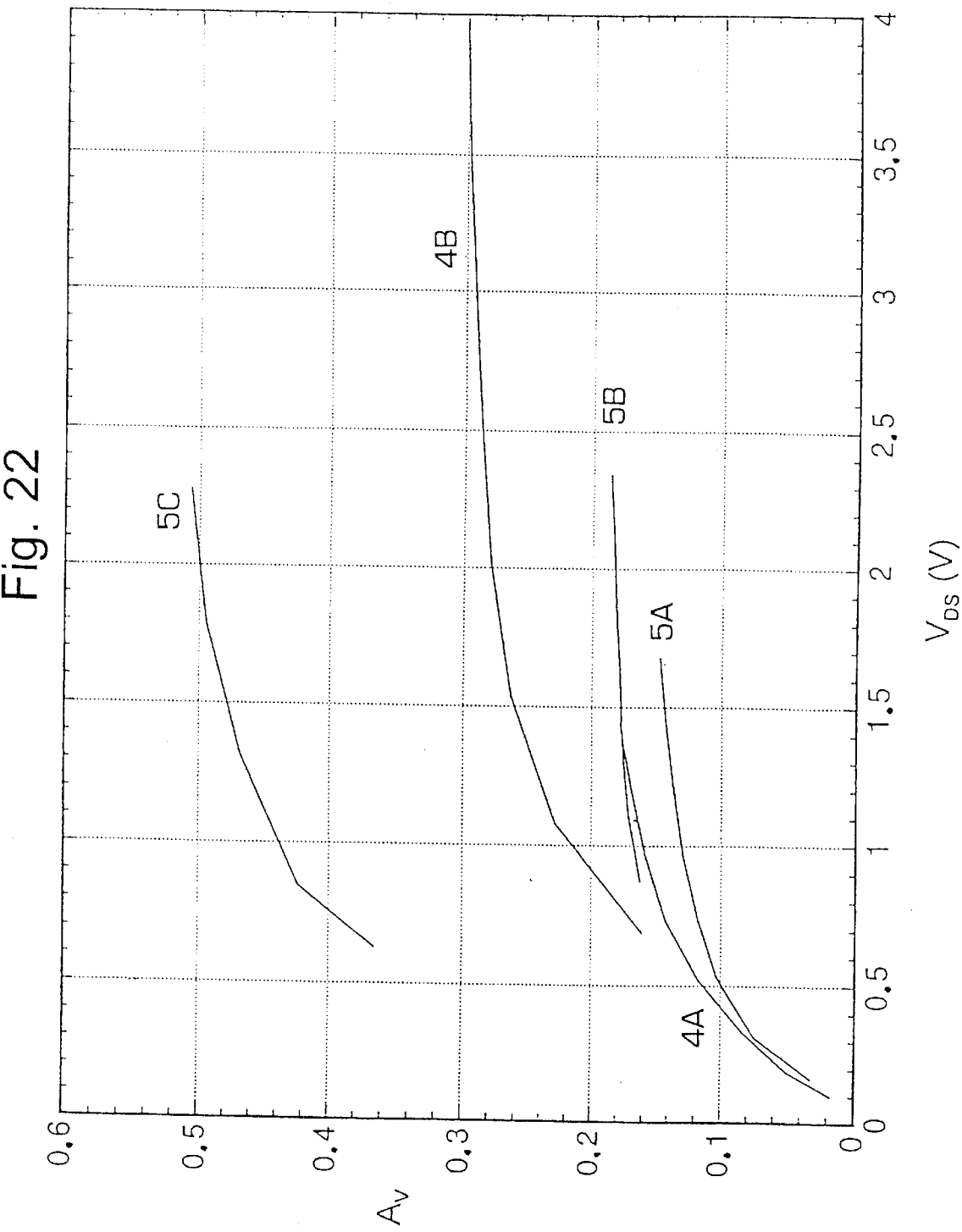
FIG. 22 shows the voltage amplification $A_v$ (gain) as a function of drain-source voltage VDS for the five examples of FIG. 15.
Figure 23:
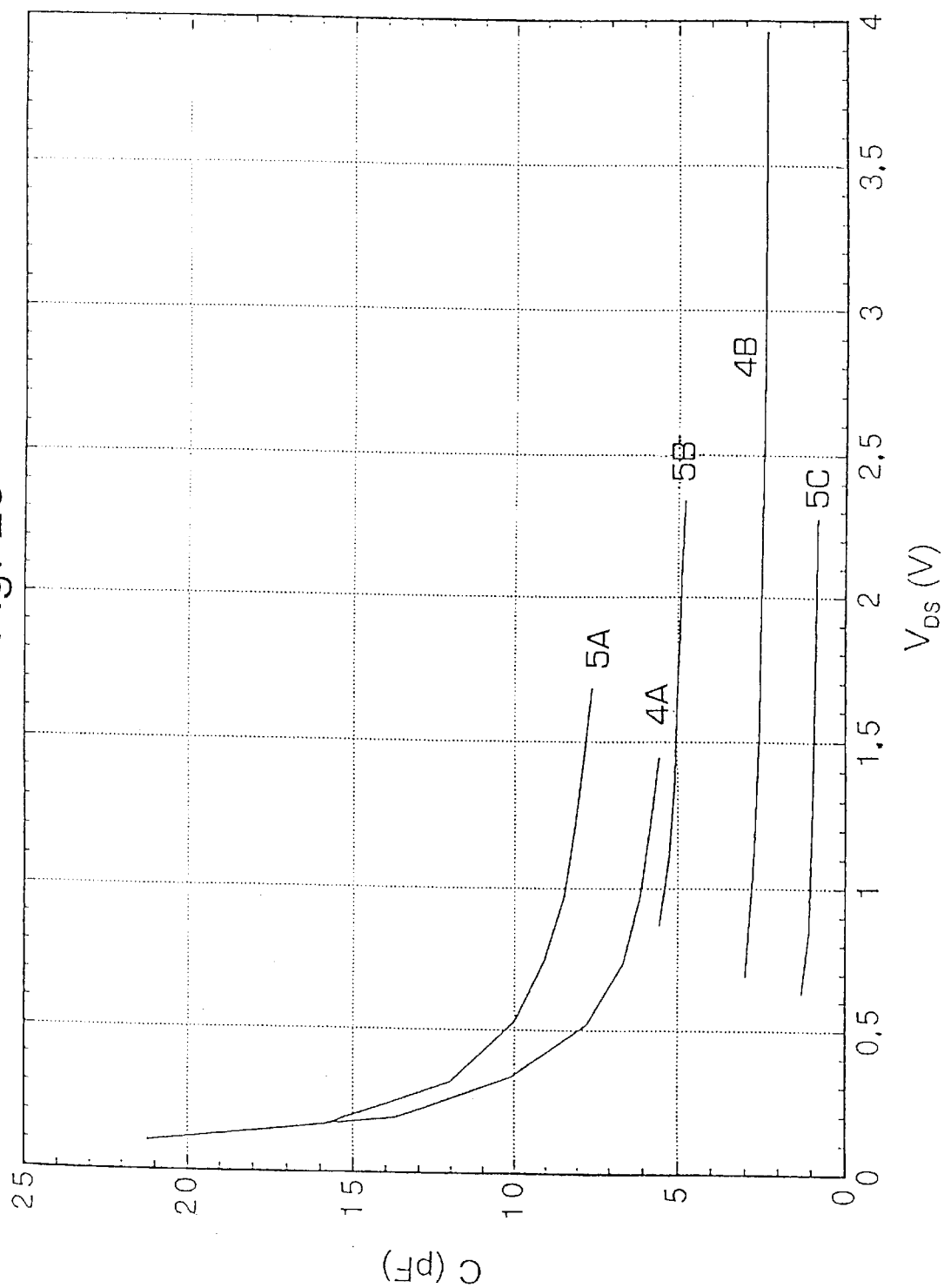
FIG. 23 shows the input capacitance C as a function of drain-source voltage VDS for the five examples of FIG. 15.
Figure 24:
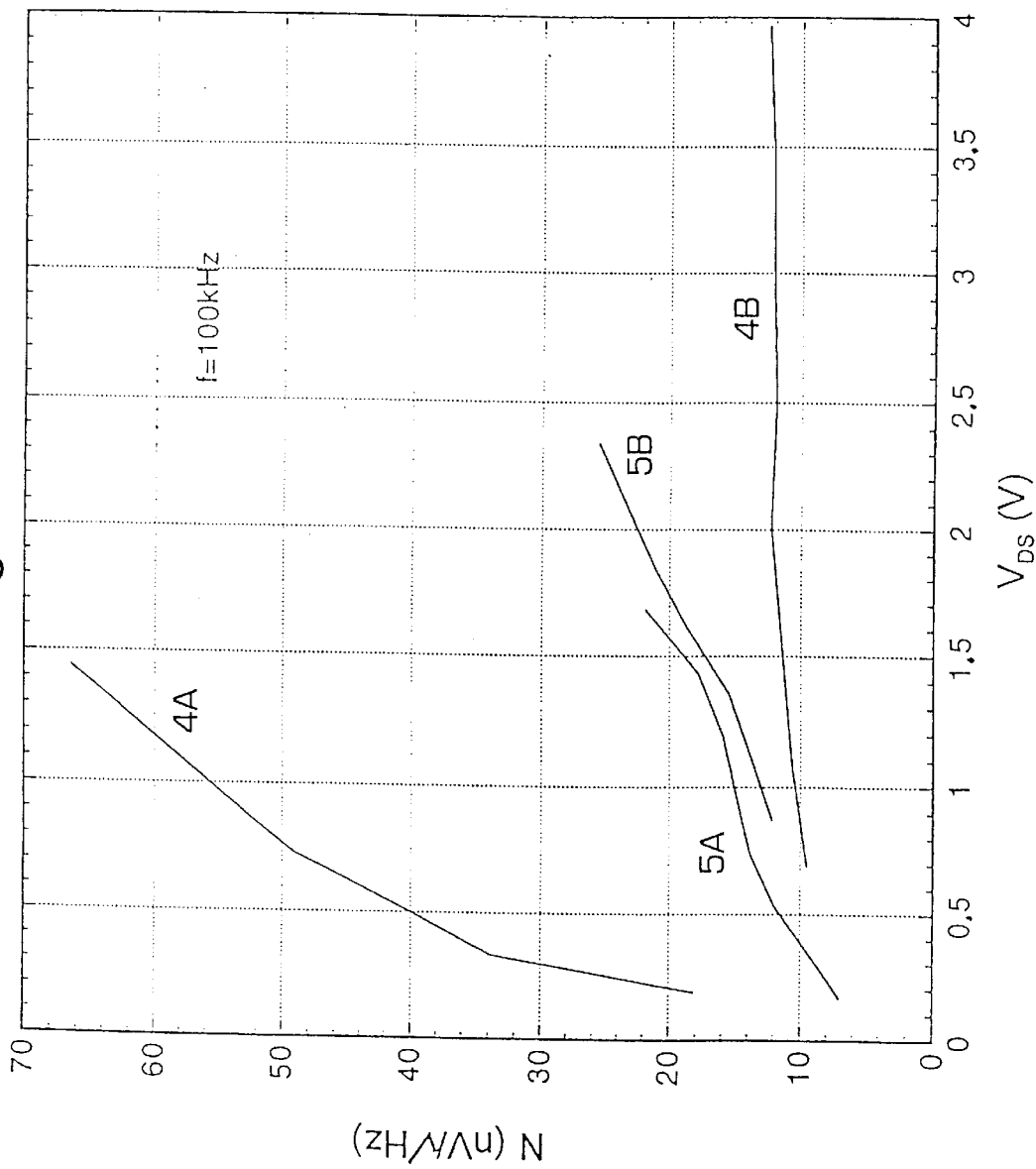
FIG. 24 shows the output voltage noise in $nV/(Hz)^{1/2}$ as a function of drain-source voltage VDS for examples 4A, 4B, 5A and 5B of FIG. 15 with 100 kHz tuning forks.
Figure 25:
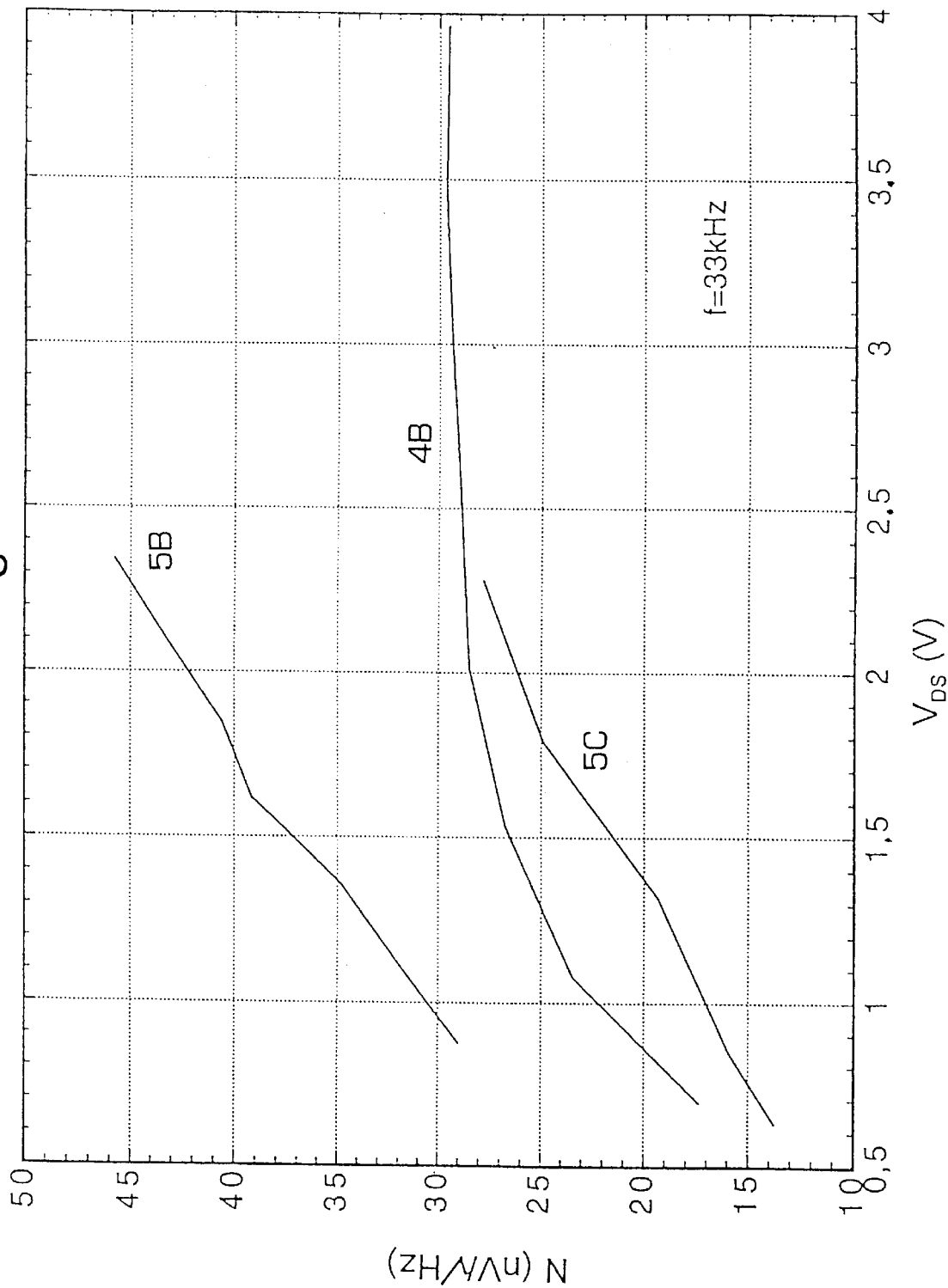
FIG. 25 shows the output voltage noise $nV/(Hz)^{1/2}$ as a function of drain-source voltage VDS for examples 4B, 5B and 5C of FIG. 15 with 33 kHz tuning forks.

FIGS. 22, 24 and 25 show measured data, whereas FIG. 23 is calculated from measured data and component parameters. The measurements were taken with AC input voltages from the tuning forks in the range 100 to 300 microvolts.

The basic behavior of the rising edge of the signal-to-noise ratio (S/N) in FIG. 21 can now be understood with reference to FIGS. 22 and 23 which show that the FETs do not operate efficiently until VDD rises above approximately 1 volt, having poor gain (FIG. 22) and high input capacitances (FIG. 23) at lower voltages.

The basic behavior of the falling part of the signal-to-noise ratio can be understood with reference to FIGS. 24 and 25 which show, for all the GaAs-MESFET examples (but not the JFET Example 4B), an increase in noise as bias voltage VDD increases.

It is thus expected that all the GaAs-NESFET examples will have signal-to-noise ratio characteristics having the same form as FIG. 21, but with different ranges for different circuit variations, oscillator frequencies and temperatures.

The examples of the fifth embodiment having a bootstrap are considered to be an improvement over the fourth embodiment. As Example 5A uses the same FET as Example 4A, a fair comparison can be drawn between fourth and fifth embodiments in this case and it can be seen from FIG. 24 that the noise characteristics for the bootstrapped circuit 5B are superior.

The general improvement of noise characteristics with increasing oscillator frequency is evident from a comparison of the two Examples 4B and 5B that were tested at two frequencies, with reference to FIG. 24 (100 kHz) and FIG. 25 (33 kHz).

Although the signal-to-noise ratio is poor for VDD>5V, the specification sheet of the FET 3SK166 used in Examples 4A and 5A in fact specifies drain-source voltages VDS of 8 and 12 volts respectively! It is thus surprising that the noise characteristics in the tested circuits are so bad at the bias voltages which should provide for "normal" operation.

Moreover, the input capacitance of the FET 3SK166, used in Examples 4A and 5A, is specified to have a typical value of 1.3 pF at VDD=5V and ID=10 mA and the input capacitance of the 33 kHz and 100 kHz tuning forks to be only 1.46 pF and 1.2 pF respectively. However, the results shown in FIG. 23 indicate that the input capacitance of the circuits is much larger than specified in the FET data sheets. The results thus show that the specification sheets issued by the manufacturer do not provide even a general guide to the performance of the FET concerned under the abnormal conditions in which they are used here with low drain-source voltages and correspondingly low drain currents, and with a signal source connected to the gate which has a very low, almost purely capacitive impedance in the picofarrad range.

To confirm that the circuits built were not faulty and that their strange operating characteristics and optimum operating values were not artefacts, the circuits of all five examples were remeasured but with a capacitance of 1.0 nanofarrad i.e. with an input capacitance of the order of one-thousand times larger than that of a quartz tuning fork. The plot of these results (not shown) of voltage gain versus drain-source voltage, i.e. the equivalent plot to FIG. 22, shows gain curves which, for all five examples, rise to saturate at values of between 0.75 and 0.9 by a value of drain-source voltage VDD of about 1V. These results thus confirm that the very low input capacitance of the piezoelectric voltage source, as represented for example by a tuning fork, has a major effect on circuit design and performance.

The fact that the circuits are operating on their limits as far as their performance as source-follower circuits are concerned is evident from a comparison of the gain characteristics of FIG. 22 with the input capacitance characteristics of FIG. 23. The gain (AV=Vout/Vin) is strongly correlated with the input impedance of the circuit, which as mentioned is dominated by the input impedance of the FET, and peaks at only approximately 0.5 for Example 5C and less than 0.2 for Examples 4A, 5A and 5B, as is shown in FIG. 22. The source-follower circuits are thus reducing the signal voltage by between 2 and 5 times.

However, despite this reduction the circuits provide a beneficial effect, since the output impedance of the SPM head of the examples of the fourth and fifth embodiments is only of the order of a hundred ohms, instead of a megaohm in the case of an SPM head according to the first embodiment which delivers its output directly from a tuning fork. Consequently, voltage losses in a cable used to connect the SPM head to the signal amplifier are negligible, so that cable length is no longer a significant consideration, thus eliminating a design constraint of considerable practical importance. For example, performance will not change appreciably whether the signal amplifier is connected as directly as possible to the SPM, is connected by a 20 centimeter cable or is connected by a 10 meter cable.

By comparison, the voltage gain AV of an SPM head according to the first embodiment in which the output signal is taken directly from a tuning fork, as in the lower curve of FIG. 20, is expressed by AV=CS/(CS+CC) where CS is the capacitance of the tuning fork and CC the capacitance of the cable used to connect the SPM head to the signal amplifier. Since CS, the output impedance of such an SPM head, is approximately one picofarrad (i.e. around a megaohm at 100 kHz) and cable capacitance is around 100 picofarrad per meter voltage, voltage gain will be dependent on cable length, having a value of around only 0.01 for a typical cable length of one meter.

The difference between the upper and lower curves of FIG. 20 can thus be appreciated having regard to the output impedance of a piezoelectric element, for example a tuning fork, as compared with the output impedance of a circuit according to the fourth and fifth embodiments.

What we claim is:

1. A head for a scanning probe microscope, the head comprising:

(a) a tip for interacting with a sample;
   (b) a piezoelectric element connected to the tip and having a first pick-up electrode for picking up an AC electrical signal generated by oscillation of the piezoelectric element and influenced by external forces acting on the tip, said piezoelectric element having a second pick-up electrode connected to earth; and
   (c) a signal processing circuit for receiving said AC electrical signal from said first pick-up electrode of the piezoelectric element as input, processing said signal and delivering said signal from the head as an output signal for a signal amplifier, said signal processing circuit comprising a field effect transistor having a source, a drain, and a gate, said gate being connected to said first pick-up electrode to receive said AC electrical signal.

2. The head of claim 1, said gate being connected by a first conductive path to said first pick-up electrode and by a first resistive path to earth, said drain being connected by a second conductive path to an input for receiving a bias voltage for the field effect transistor, and said source being connected by a second resistive path to earth and by a third conductive path to an output for delivering said output signal, whereby said field effect transistor is arranged in said signal processing circuit in a source-follower configuration.

3. The head of claim 2, said first resistive path having a resistance of at least one megaohm and said second resistive path having a resistance of at least five hundred ohm.

4. The head of claim 2, said source and said first resistive path being connected by a second capacitive path, whereby said first resistive path is subdivided into a gate-side section and an earth-side section in a bootstrapped configuration.

5. The head of claim 4, said second capacitive path having a capacitance of at least one nanofarrad.

6. The head of claim 4, said gate-side section of the first resistive path having a resistance of at least ten times that of said earth-side section.

7. The head of claim 4, said earth-side section of the first resistive path having a resistance of at least twice that of said second resistive path.

8. The head of claim 1 and comprising an oscillator for setting the piezoelectric element in oscillation at a resonance frequency thereof.

9. The head of claim 1, said field effect transistor being a MESFET.

10. The head of claim 9, said MESFET being a GaAs-MESFET.

11. The head of claim 1, said field effect transistor being a JFET.

12. The head of claim 1, the piezoelectric element comprising at least two piezoelectric parts, said at least two piezoelectric parts forming a coupled oscillator.

13. The head of claim 1, the piezoelectric element being a tuning fork.

14. A scanning probe microscope comprising:

(a) a tip for interacting with a sample;
   (b) a piezoelectric element connected to the tip and having a first pick-up electrode for picking up an AC electrical signal generated by oscillation of the piezoelectric element and influenced by external forces acting on the tip, said piezoelectric element having a second pick-up electrode connected to earth;
   (c) a signal processing circuit for receiving said AC electrical signal from said first pick-up electrode of the piezoelectric element as input, processing said signal and delivering a processed signal to a signal output terminal of said signal processing circuit, said signal processing circuit comprising a field effect transistor having a source, a drain, and a gate, said gate being connected to said first pick-up electrode to receive said AC electrical signal;
   (d) a signal amplifier having a signal input terminal; and
   (e) a cable arranged to connect said signal output terminal of said signal processing circuit to said signal input terminal of said signal amplifier.

15. The microscope of claim 14, said cable having an impedance of greater than ten picofarrads.

16. The scanning probe microscope of claim 14, said gate being connected by a first conductive path to said first pick-up electrode and by a first resistive path to earth, said drain being connected by a second conductive path to an input for receiving a bias voltage for the field effect transistor, and said source being connected by a second resistive path to earth and by a third conductive path to said signal output terminal, whereby said field effect transistor is arranged in said signal processing circuit in a source-follower configuration.

17. The scanning probe microscope of claim 16, said source and said first resistive path being connected by a second capacitive path, whereby said first resistive path is subdivided into a gate-side section and an earth-side section in a bootstrapped configuration.

18. The microscope of claim 14, said cable having an impedance of greater than fifty picofarrads.

19. The microscope of claim 14, said cable having an impedance of greater than one hundred picofarrads.

20. The microscope of claim 14, said cable having an impedance of greater than two hundred picofarrads.

* * * * *